(12) United States Patent
Breen et al.

(10) Patent No.: US 12,511,538 B2
(45) Date of Patent: Dec. 30, 2025

(54) HYBRID GRAPH-BASED PREDICTION MACHINE LEARNING FRAMEWORKS

(71) Applicant: Optum Services (Ireland) Limited, Dublin (IE)

(72) Inventors: Conor Breen, Dublin (IE); David Belton, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 789 days.

(21) Appl. No.: 17/654,146

(22) Filed: Mar. 9, 2022

(65) Prior Publication Data
US 2023/0289586 A1 Sep. 14, 2023

(51) Int. Cl.
*G06N 3/08* (2023.01)

(52) U.S. Cl.
CPC ....................... *G06N 3/08* (2013.01)

(58) Field of Classification Search
CPC .......... G06N 3/08; G06N 3/09; G06N 3/0464; G06F 5/00; G06F 9/3555
See application file for complete search history.

(56) References Cited

U.S. PATENT DOCUMENTS

| | | | |
|---|---|---|---|
| 9,230,342 B1 * | 1/2016 | Yates | G06F 3/14 |
| 11,170,450 B1 | 11/2021 | Magoon et al. | |
| 11,593,622 B1 * | 2/2023 | Gandhi | G06N 3/0464 |
| 2015/0081578 A1 | 3/2015 | McLaughlin et al. | |
| 2018/0053096 A1 * | 2/2018 | Farrell | G06F 16/9024 |
| 2019/0304023 A1 | 10/2019 | Pingali et al. | |
| 2020/0104113 A1 * | 4/2020 | Grill | G06F 8/65 |
| 2020/0272740 A1 * | 8/2020 | Obee | G06F 21/577 |
| 2021/0042683 A1 * | 2/2021 | Francis | H04L 67/306 |
| 2021/0202053 A1 | 7/2021 | Poteet, III et al. | |
| 2022/0122092 A1 * | 4/2022 | Ribeiro | G06Q 30/0185 |
| 2022/0392056 A1 * | 12/2022 | Sawal | G06N 3/0464 |

OTHER PUBLICATIONS

Sami Abu-El-Haija, Amol Kapoor, Bryan Perozzi, Joonseok Lee, N-GCN: Multi-scale Graph Convolution for Semi-supervised Node Classification, arXiv:1802.08888 (Year: 2018).*
"GNN Cheatsheet," Pytorch Geometric Documentation, (4 pages), available online at URL: https://pytorch-geometric.readthedocs.io/en/latest/notes/cheatsheet.html.

(Continued)

*Primary Examiner* — Abdullah Al Kawsar
*Assistant Examiner* — Gisel Gabriela Faccenda
(74) *Attorney, Agent, or Firm* — Alston & Bird LLP

(57) ABSTRACT

Various embodiments of the present invention disclose techniques for determining a graph-based prediction based at least in part on a cross-entity relationship graph data object and using a hybrid graph-based processing machine learning framework. In some embodiments, the hybrid graph-based prediction machine learning framework is configured to generate the graph-based prediction based at least in part on a comprehensive representation of the cross-entity relationship graph data object that is generated based at least in part on output data of a graph convolutional neural machine learning model and an image-based graph convolutional neural network machine learning model.

14 Claims, 11 Drawing Sheets

(56) References Cited

OTHER PUBLICATIONS

"How Can I Add Geographic Distance Matrix To An iGraph Network?," Stack Overflow, Nov. 26, 2020, (2 pages), (online), [Retrieved from the Internet Jun. 16, 2022] <URL: https://stackoverflow.com/questions/64933890/how-can-i-add-geographic-distance-matrix-to-an-igraph-network>.

"Network With Node Size Based on Edge Number," R Graph Gallery, (Year: 2018), (3 pages), (online) [Retrieved from the Internet Jun. 16, 2022] <URL: https://r-graph-gallery.com/251-network-with-node-size-based-on-edges-number.html>.

Bai, Song et al. "Hypergraph Convolution and Hypergraph Attention," arXiv preprint arXiv:1901.08150v2 [cs.LG] Oct. 10, 2020, (30 pages), available online at URL: https://arxiv.org/pdf/1901.08150.pdf.

Huang, Gao et al. "Deep Networks With Stochastic Depth," arXiv preprint arXiv:1603.09382v3 [cs.LG] Jul. 28, 2016, (16 pages), available online at URL: https://arxiv.org/pdf/1603.09382.pdf.

Mouco, Joao Marques Paredes. "Insurance Fraud Detection—Using Complex Networks To Detect Suspicious Entity Relationships," Doctoral Dissertation, Faculdade De Ciencias E Tecnologia, Universidade Nova De Lisboa, Sep. 2019, (153 pages).

Oskarsdottir, Maria et al. "Social Network Analytics For Supervised Fraud Detection In Insurance," arXiv preprint arXiv:2009.08313v1, Sep. 15, 2020, (37 pages).

Sun, Xu et al. "Feature-Frequency-Adaptive On-Line Training For Fast and Accurate Natural Language," Computational Linguistics, vol. 40, No. 3, Sep. 16, 2013, pp. 563-586, DOI: 10.1162/COLL_a_00193.

\* cited by examiner

```
"node1":{
 "type":"node",
 "id":"E1",
 "sizeattr":50
},
"node2":{
 "type":"node",
 "id":"E2",
 "sizeattr":100
},
"edge1":{                      ⎫
 "type":"edge",                ⎬ 501
 "id1":"E1",                   ⎪
 "id2":"E2",                   ⎪
 "contriattr":0.20,            ⎪
 "distattr":1550               ⎭
},
"edge2":{                      ⎫
 "type":"edge",                ⎬ 502
 "id1":"E2",                   ⎪
 "id2":"E1",                   ⎪
 "contriattr":050,             ⎪
 "distattr":1550               ⎭
},
```

```
"node1": {
  "type":"node",
  "id": "E1",
  "sizeattr": 50
},
"node2": {
  "type":"node",
  "id": "E2",
  "sizeattr": 100
},
"edge1": {
  "type": "edge",
  "id1": "E1",
  "id2":"E2",
  "contriattr": 0.20,
},
"edge1": {
  "type": "edge",
  "id1": "E2",
  "id2":"E1",
  "contriattr": 050,
},
"pair1": {
  "type": "pair",
  "id1": "E1",
  "id2":"E2",
  "distattr": 1550
},
```

HYBRID GRAPH-BASED PREDICTION MACHINE LEARNING FRAMEWORKS

BACKGROUND

Various embodiments of the present invention address technical challenges related to accurately determining graph-based predictions given limitations of existing graph convolutional neural network machine learning models. In doing so, various embodiments of the present invention make important contributions to various existing predictive data analysis systems.

BRIEF SUMMARY

Various embodiments of the present invention disclose techniques for determining a graph-based prediction based at least in part on a cross-entity relationship graph data object and using a hybrid graph-based processing machine learning framework. In some embodiments, the hybrid graph-based prediction machine learning framework is configured to generate the graph-based prediction based at least in part on a comprehensive representation of the cross-entity relationship graph data object that is generated based at least in part on output data of a graph convolutional neural machine learning model and an image-based graph convolutional neural network machine learning model. Using some of the techniques described herein, a proposed system can augment predictive inferences generated by graph convolutional neural network machine learning models with predictive inferences generated by other machine learning models to overcome the limitations of existing graph convolutional neural network machine learning models and to holistically process feature data described by complex graph data objects.

In accordance with one aspect, a method includes: identifying a cross-entity relationship graph data object associated with the plurality of predictive entities, wherein the cross-entity relationship graph data object comprises: (i) for each predictive entity, an entity node of a plurality of entity nodes, (ii) for each entity node, an entity node attribute that is determined based at least in part on an entity size measure associated with the predictive entity that is associated with the entity node, (iii) a group of directed entity relationship edges each associated with a source entity node for a source predictive entity and a destination entity node for a destination predictive entity, (iv) for each directed relationship edge, a direction-aware weight attribute that is determined based at least in part on a normalized historical contribution measure of the source predictive entity associated with the directed relationship edge and the destination predictive entity associated with the directed relationship edge, and (v) for each entity node pair of a group of entity pairs that comprises a first entity node associated with a first predictive entity and a second entity node associated with a second predictive entity, a direction-agnostic distance attribute that is determined based at least in part on a cross-entity distance measure for an entity pair comprising the first predictive entity and the second predictive entity; generating, using the hybrid graph-based processing machine learning framework, and based at least in part on the cross-entity relationship graph data object and a node representation for the entity node associated with the primary predictive entity, a related subset of the plurality of predictive entities for the entity node; and for each related predictive entity in the related subset: (i) determining, using an intervention database, an intervention entity associated with the related predictive entity, and (ii) performing one or more prediction-based actions based at least in part on the intervention entity associated with the related predictive entity.

In accordance with another aspect, an apparatus comprising at least one processor and at least one memory including program code, the at least one memory and the program code configured to, with the processor, cause the apparatus to at least: identify a cross-entity relationship graph data object associated with the plurality of predictive entities, wherein the cross-entity relationship graph data object comprises: (i) for each predictive entity, an entity node of a plurality of entity nodes, (ii) for each entity node, an entity node attribute that is determined based at least in part on an entity size measure associated with the predictive entity that is associated with the entity node, (iii) a group of directed entity relationship edges each associated with a source entity node for a source predictive entity and a destination entity node for a destination predictive entity, (iv) for each directed relationship edge, a direction-aware weight attribute that is determined based at least in part on a normalized historical contribution measure of the source predictive entity associated with the directed relationship edge and the destination predictive entity associated with the directed relationship edge, and (v) for each entity node pair of a group of entity pairs that comprises a first entity node associated with a first predictive entity and a second entity node associated with a second predictive entity, a direction-agnostic distance attribute that is determined based at least in part on a cross-entity distance measure for an entity pair comprising the first predictive entity and the second predictive entity; generate, using the hybrid graph-based processing machine learning framework, and based at least in part on the cross-entity relationship graph data object and a node representation for the entity node associated with the primary predictive entity, a related subset of the plurality of predictive entities for the entity node; and for each related predictive entity in the related subset: (i) determine, using an intervention database, an intervention entity associated with the related predictive entity, and (ii) perform one or more prediction-based actions based at least in part on the intervention entity associated with the related predictive entity.

In accordance with yet another aspect, a computer program product computer program comprising at least one non-transitory computer-readable storage medium having computer-readable program code portions stored therein, the computer-readable program code portions configured to: identify a cross-entity relationship graph data object associated with the plurality of predictive entities, wherein the cross-entity relationship graph data object comprises: (i) for each predictive entity, an entity node of a plurality of entity nodes, (ii) for each entity node, an entity node attribute that is determined based at least in part on an entity size measure associated with the predictive entity that is associated with the entity node, (iii) a group of directed entity relationship edges each associated with a source entity node for a source predictive entity and a destination entity node for a destination predictive entity, (iv) for each directed relationship edge, a direction-aware weight attribute that is determined based at least in part on a normalized historical contribution measure of the source predictive entity associated with the directed relationship edge and the destination predictive entity associated with the directed relationship edge, and (v) for each entity node pair of a group of entity pairs that comprises a first entity node associated with a first predictive entity and a second entity node associated with a second predictive entity, a direction-agnostic distance attribute that is determined based at least in part on a cross-entity distance measure for an entity pair comprising the first predictive entity and the second predictive entity; generate, using the hybrid graph-based processing machine learning framework, and based at least in part on the cross-entity relationship graph data object and a node representation for the entity node associated with the primary predictive entity, a related subset of the plurality of predictive entities for the entity node; and for each related predictive entity in the related subset: (i) determine, using an intervention database, an intervention entity associated with the related predictive entity, and (ii) perform one or more prediction-based actions based at least in part on the intervention entity associated with the related predictive entity.

BRIEF DESCRIPTION OF THE DRAWINGS

Figure 1:
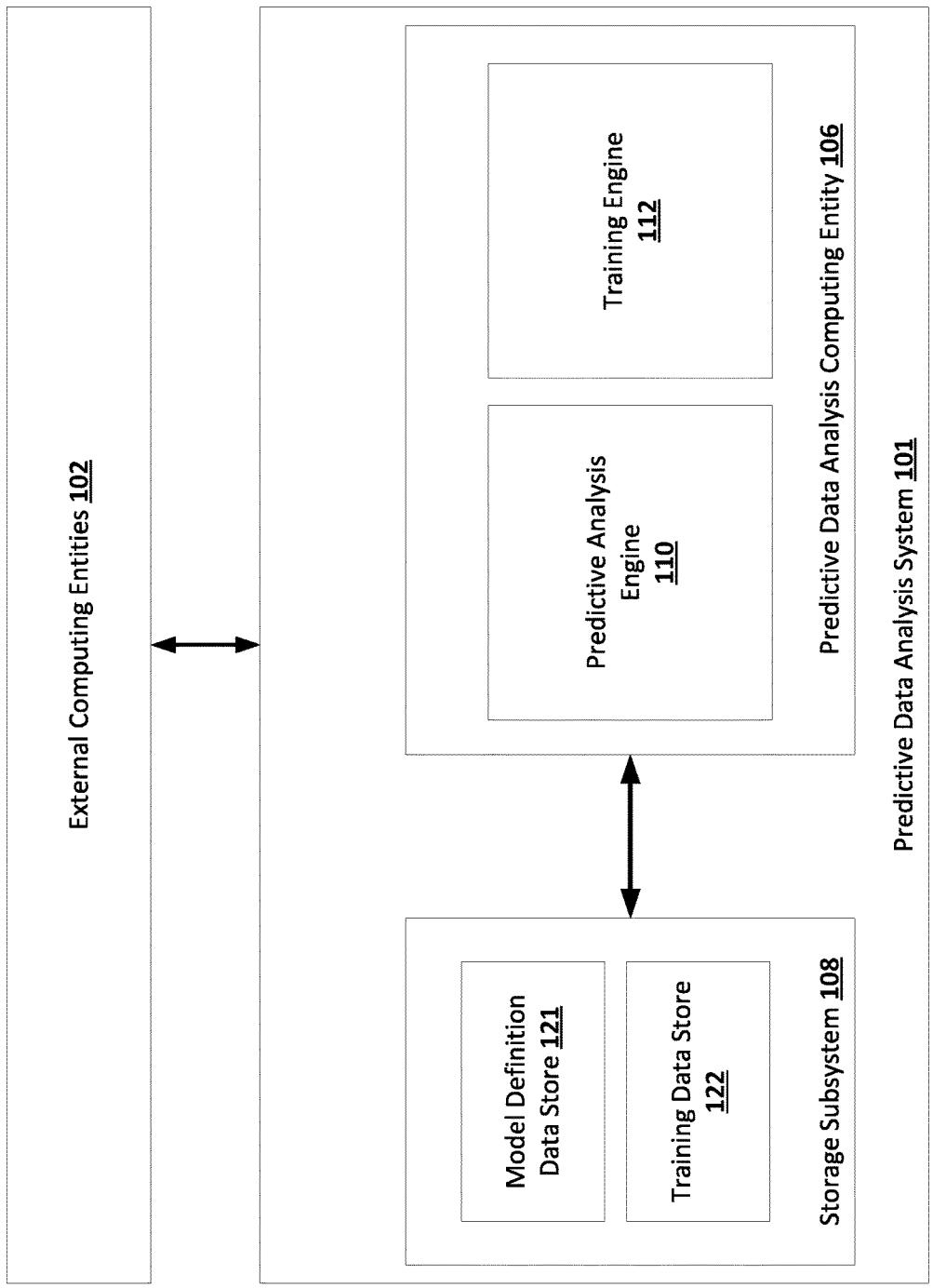

Having thus described the invention in general terms, reference will now be made to the accompanying drawings, which are not necessarily drawn to scale, and wherein:

FIG. 1 provides an exemplary overview of a system that can be used to practice embodiments of the present invention.

Figure 2:
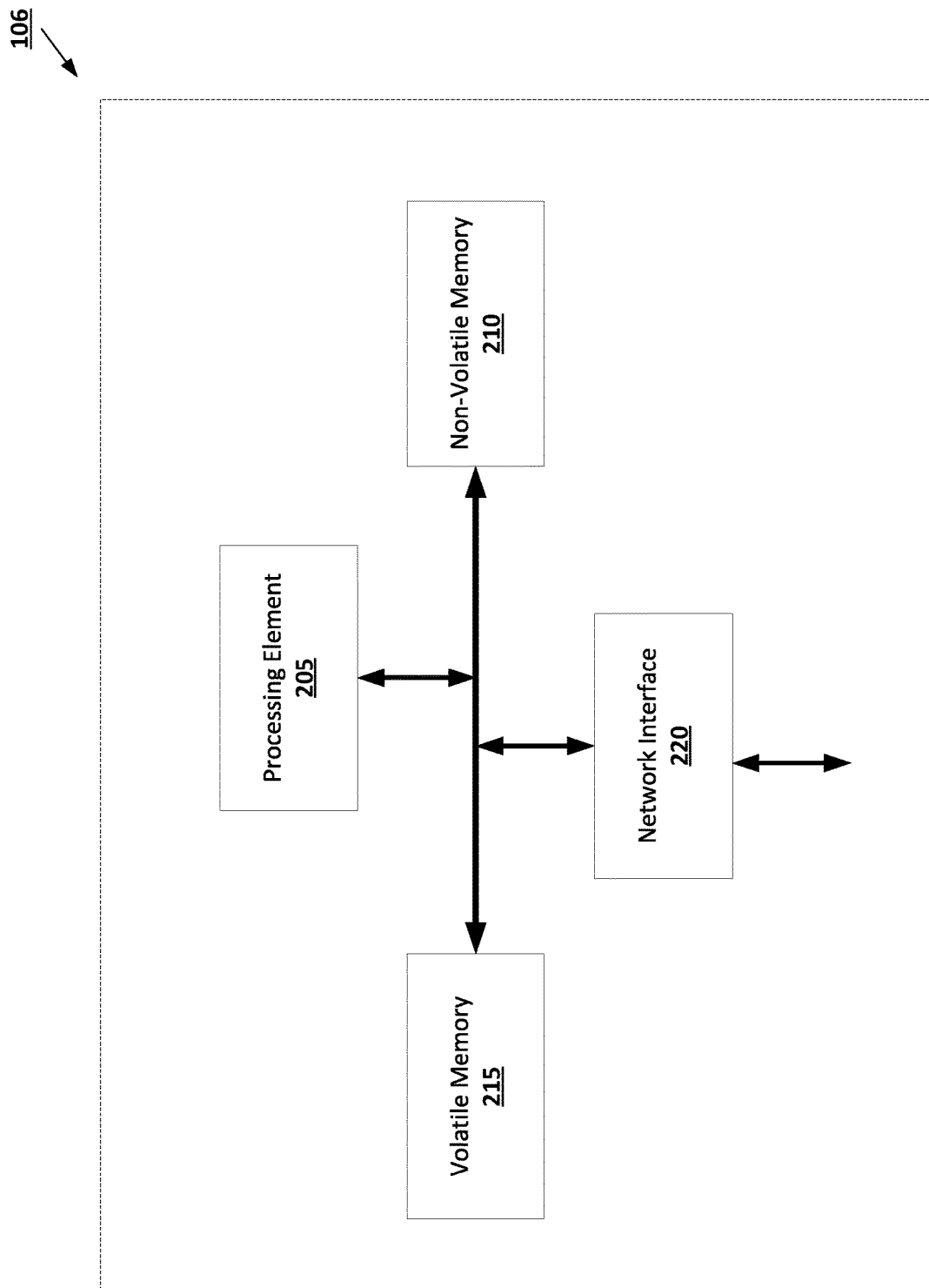

FIG. 2 provides an example predictive data analysis computing entity in accordance with some embodiments discussed herein.

Figure 3:
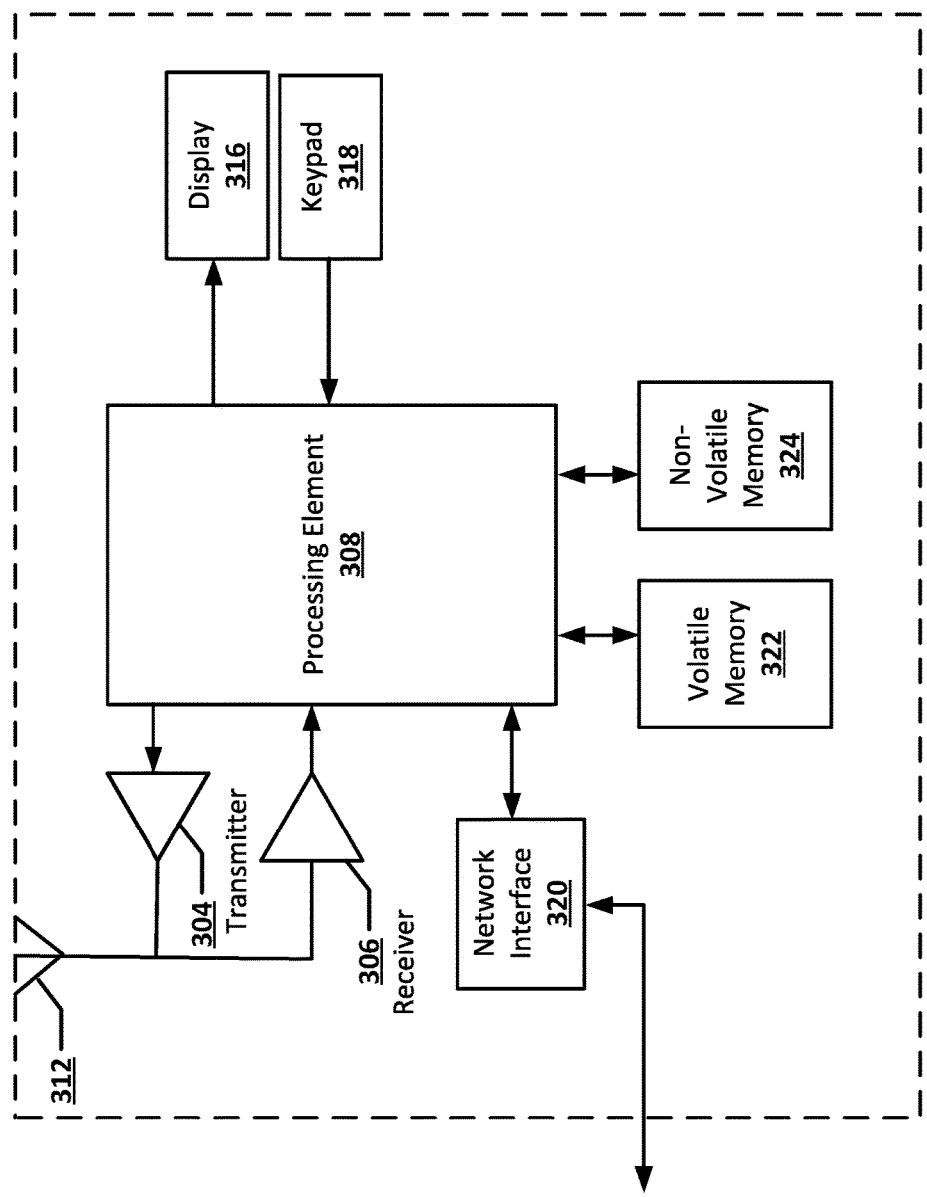

FIG. 3 provides an example external computing entity in accordance with some embodiments discussed herein.

Figure 4:
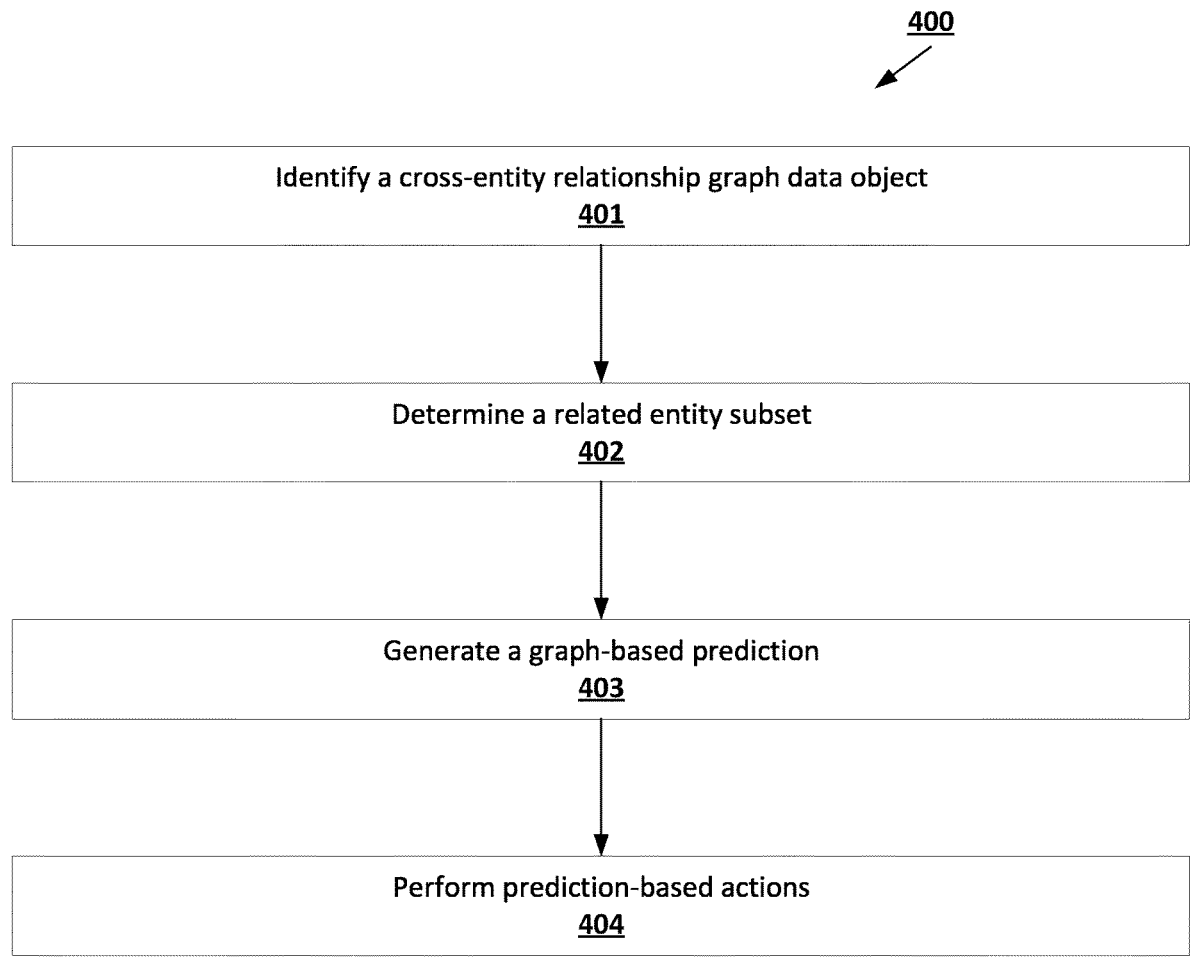

FIG. 4 provides a flowchart diagram of an example process for generating a graph-based prediction for a primary predictive entity of E predictive entities using a hybrid graph-based processing machine learning framework in accordance with some embodiments discussed herein.

FIGS. 5A-5B provide operational examples of two cross-entity relationship graph data objects in accordance with some embodiments discussed herein.

Figure 6:
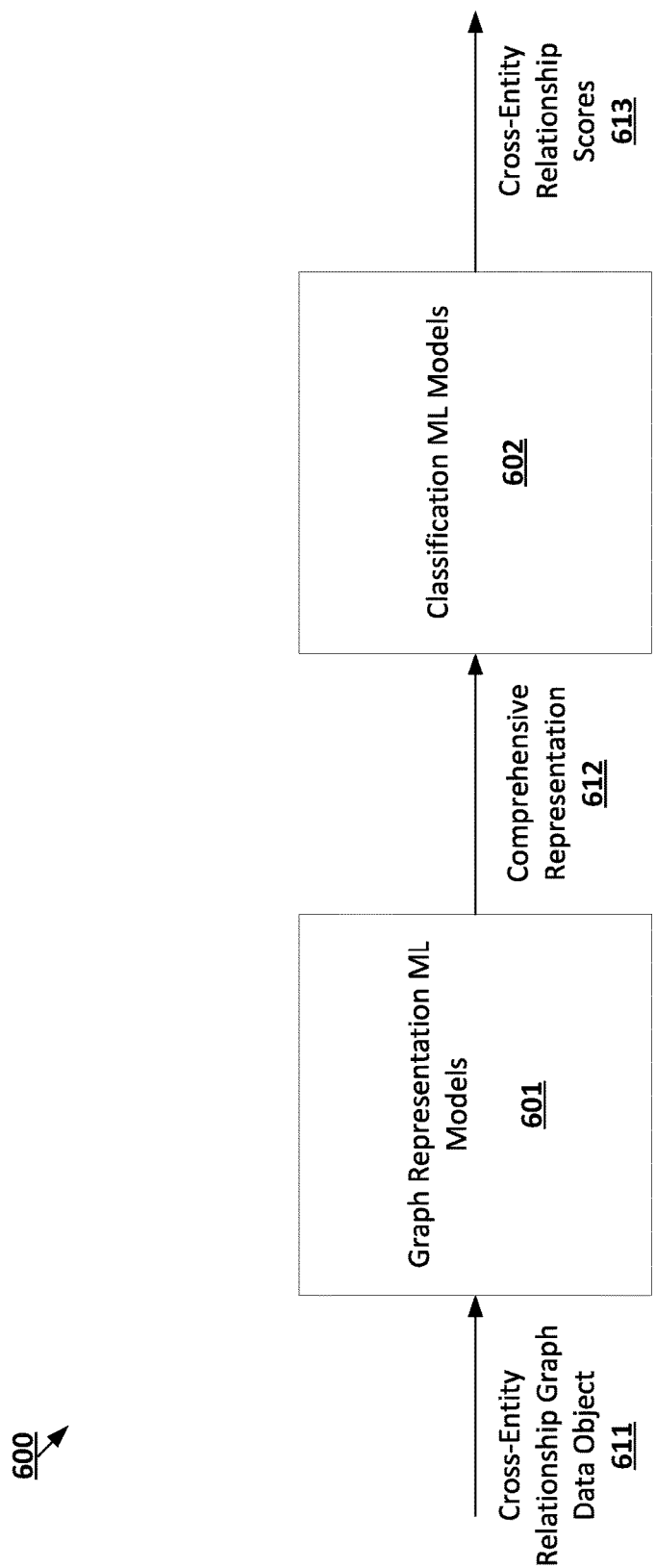

FIG. 6 provides an operational example of a hybrid graph-based processing machine learning framework in accordance with some embodiments discussed herein.

Figure 7:
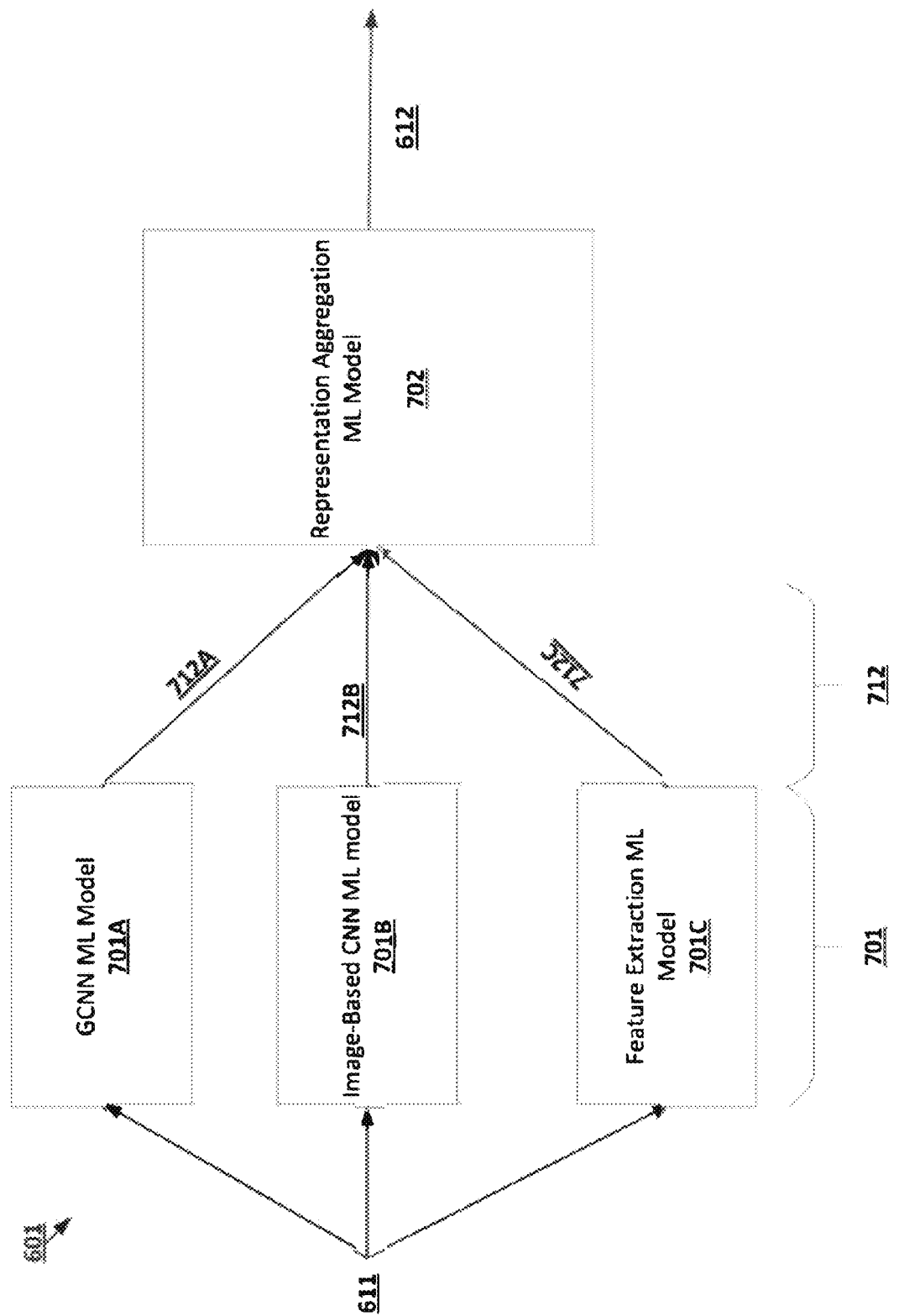

FIG. 7 provides an operational example of the graph representation machine learning models of a hybrid graph-based processing machine learning framework in accordance with some embodiments discussed herein.

Figure 8:
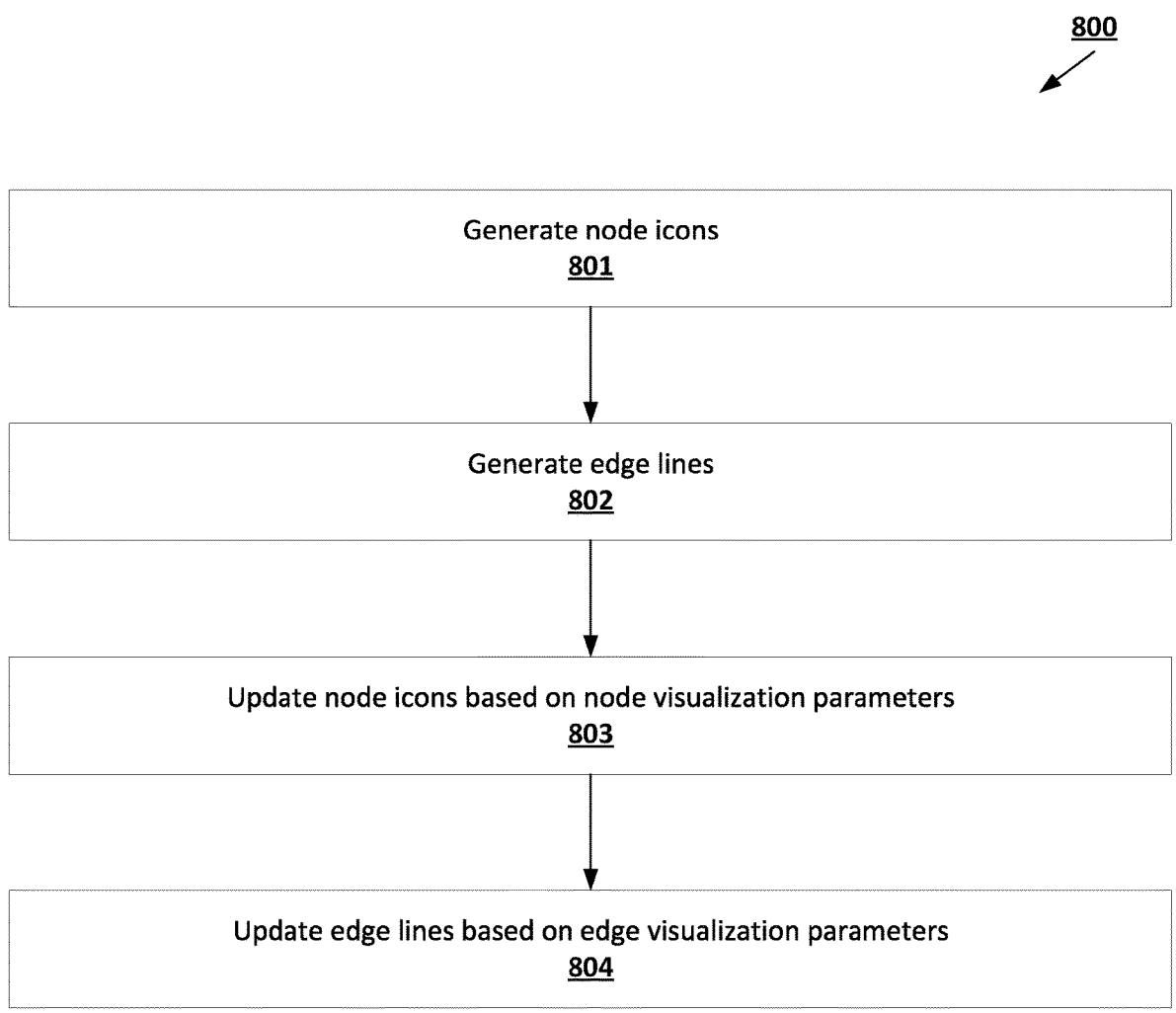

FIG. 8 is a flowchart diagram of an example process for generating a graph image data object for a cross-entity relationship graph data object in accordance with some embodiments discussed herein.

Figure 9:
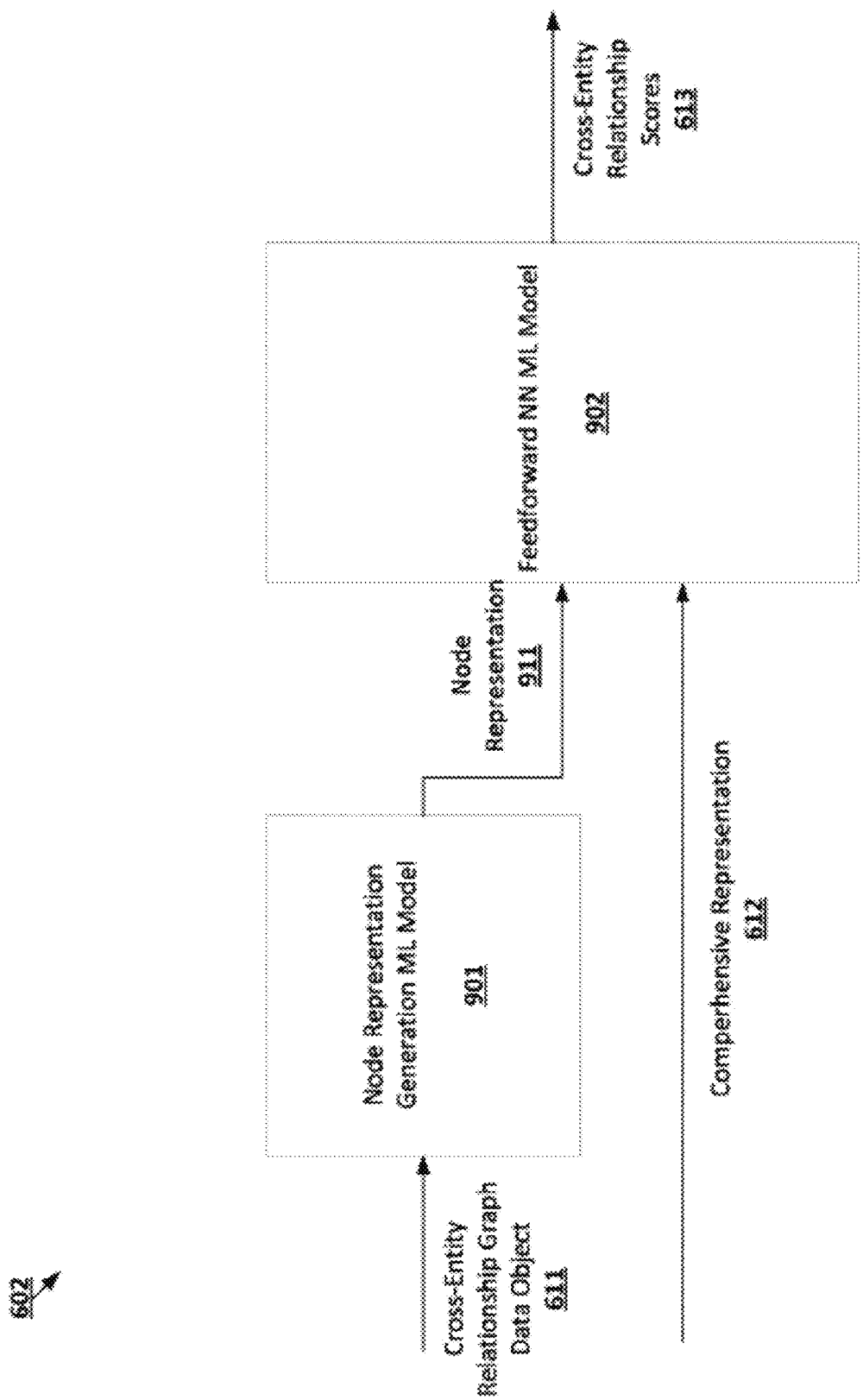

FIG. 9 provides an operational example of the classification machine learning models of a hybrid graph-based processing machine learning framework in accordance with some embodiments discussed herein.

Figure 10:
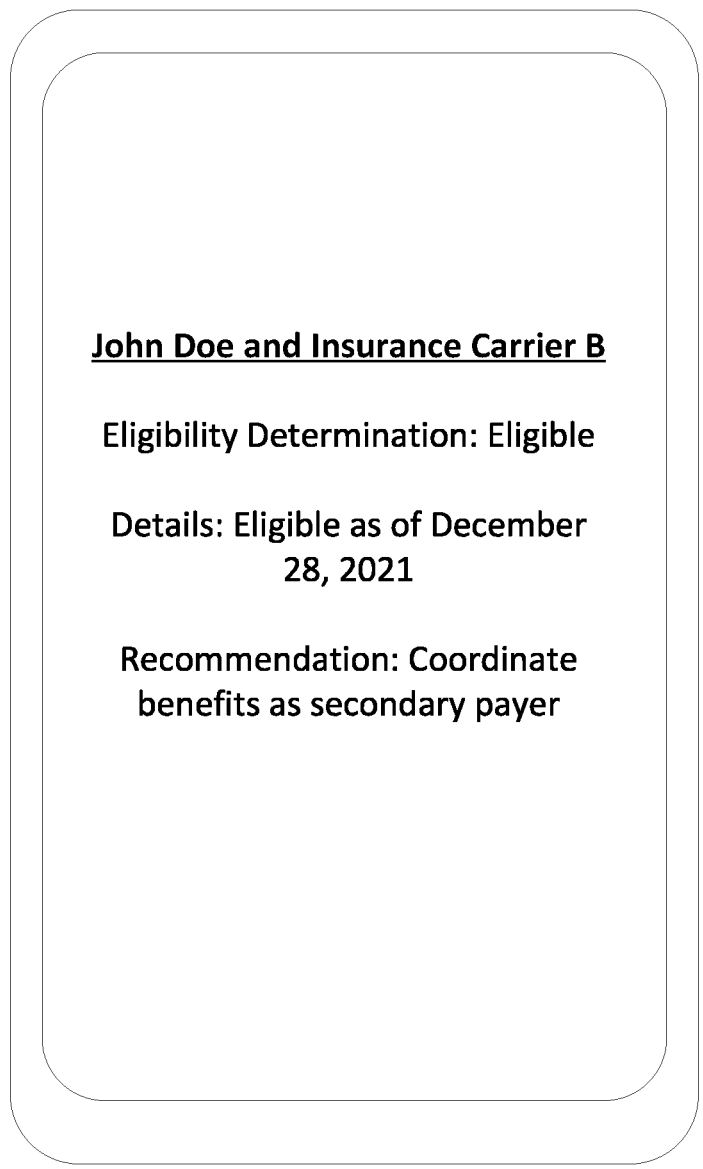

FIG. 10 provides an operational example of an eligibility alert notification that may be generated in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Various embodiments of the present invention make important technical contributions to improving predictive accuracy of graph-based prediction machine learning models, which in turn improves training speed and training efficiency of training graph-based prediction machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training graph-based prediction machine learning models, thus reducing the number of computational operations needed and/or the amount of training data entries needed to train graph-based prediction machine learning models. Accordingly, the techniques described herein improve at least one of the computational efficiency, storage-wise efficiency, and speed of training graph-based prediction machine learning models.

For example, various embodiments of the present invention improve predictive accuracy of graph-based prediction machine learning models by augmenting predictive inferences generated by graph convolutional neural network machine learning models with predictive inferences generated by other machine learning models to overcome the limitations of existing graph convolutional neural network machine learning models and to holistically process feature data described by complex graph data objects. As depicted in GNN Cheatsheet, available online at pytorchgeometric.readthedocs.io, existing graph-based prediction machine learning models suffer from structural inability to process feature data associated with complex graph. For example, various existing graph-based prediction machine learning models fail to capture feature data related to edge weights, edge attributes, and node attributes at the same time, let alone capture data describing interrelations of the noted graph-based feature sources. In some embodiments, a graph-based prediction machine learning model is not capable of processing feature data associated with at least one of node attributes, edge attributes, and edge weights of the cross-entity relationship graph data object, thus in some embodiments necessitating capturing such feature data using other representation generation machine learning models such as image-based convolutional neural network machine learning models and auxiliary feature extraction machine learning models.

In response, various embodiments of the present invention provide various techniques for determining a graph-based prediction based at least in part on a cross-entity relationship graph data object and using a hybrid graph-based processing machine learning framework. In some embodiments, the hybrid graph-based prediction machine learning framework is configured to generate the graph-based prediction based at least in part on a comprehensive representation of the cross-entity relationship graph data object that is generated based at least in part on output data of a graph convolutional neural machine learning model and an image-based graph convolutional neural network machine learning model. Using some of the techniques described herein, a proposed system can augment predictive inferences generated by graph convolutional neural network machine learning models with predictive inferences generated by other machine learning models to overcome the limitations of existing graph convolutional neural network machine learning models and to holistically process feature data described by complex graph data objects.

Various embodiments of the present invention make important technical contributions to improving resource-usage efficiency of post-prediction systems by using predicted eligibility scores to set the number of allowed computing entities used by the noted post-prediction systems and thus perform operational load balancing for the post-prediction systems (e.g., for COB investigation systems that use predicted COB scores as inputs to their investigative operations). For example, in some embodiments, a predictive data analysis computing entity determines D investigation classifications for D predictive entities based at least in part on the D cross-entity relationship scored for the D predictive entities (e.g., based at least in part on whether predictive entities are in the related entity subset for a particular primary predictive entity, such that a predictive entity is associated with an affirmative investigation if it is in the related entity subset). Then, the count of D predictive entities that are associated with an affirmative investigation classification, along with a resource utilization ratio for each predictive entity, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R=\text{ceil}(\Sigma_k^{k=k} ur_k)$, where R is the predicted number of computing entities needed to perform post-prediction processing operations with respect to the D predictive entities, ceil(·) is a ceiling function that returns the closest integer that is greater than or equal to the value provided as the input parameter of the ceiling function, k is an index variable that iterates over K predictive entities among the D predictive entities that are associated with affirmative eligibility classifications determined based at least in part on predicted eligibility scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated COB investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

An exemplary application of various embodiments of the present invention relate to performing data needed to facilitate Coordination of Benefits (COB) investigations. Various embodiments of the present invention use graph analytics and node prediction to identify members of one payer who are likely to have coverage with another payer. A proposed solution provides additional membership information for investigators to use as part of a COB verification process. Historical investigations may provide key components in building a graph network that is used for COB verification purposes. If Person A has coverage with one payer and also coverage with another payer through Person B (e.g., a spouse or partner), a proposed system will have necessary data to build a graph describing the employers of Person A and B, the number of historical investigations that have linked the two companies, geographic and geolocation data, as well as the identity of the payers providing health insurance coverage to employees of the two companies.

Various embodiments of the present invention described building the described graph and using a machine learning model to predict the most likely nodes (i.e., companies) that a member is connected to via other insurance coverage, as well as the most likely payers that provide the additional coverage. Each node in the graph is an employer. The edges between nodes are confirmed cases of COB between employees of the two companies. The edge weights are the number of confirmed cases of COB normalized based at least in part on employer size. The baseline predictor in the model is the edge weight. For example, if company A has 100 employees, and 50 employees of the company have been investigated and found to have other coverage through company B, the edge weight from A to B may be 0.5. If only 1 employee of company A has been found to have other coverage through company C, the edge weight may be 0.01. In the noted examples, COB is more likely though company B. A proposed system can thus use historical investigations data to see what commercial payers offer coverage with company B. They may have an exclusive contract with one insurance carrier, or offer plans from several carriers. This information can also be used by investigators to confirm if an employee of company A has other coverage, most likely with company B.

In some embodiments, the data used to build the network is sourced from historical COB investigations. Column A of the input data consists of a list of employer names who are members of a target health insurance plan. For each confirmed case of existence of other insurance coverage, Column B shows the employer providing the other coverage. This basic data can be used to construct a simple graph network. The edge weights in the network graph describe the number of COB cases between the two employers. However, additional data can be used to improve the model prediction. Node size can represent company sizes. Moreover, geolocation data can be used to highlight the important geographical links between employers in the network via inter-node distances. Plotting the network can show the COB relationships between employer nodes.

In some embodiments, each company node associated with a company is associated with a node size describing the number of employees and/or the size of the company. In some embodiments, each edge weight for an edge associated with a company node pair describes a pattern of historical investigations for the company pair associated with the company node pair. In some embodiments, each inter-node distance for a company node pair describes a geographic distance for the company pair associated with the company node pair.

In some embodiments, a proposed system uses feature data determined based at least in part on the graph network as inputs to a machine learning model to predict, for any given member, which employer is most likely to provide access to other insurance coverage (whether through spouse-to-spouse relationship, child-to-parent, or some other relationship). By extension, the model can then predict who the most likely other carrier is. In some embodiments, the inputs to the machine learning model for an input company node pair include a historical investigation feature for the input company node pair, two company size features for the input company node pair, and geographical distance features for the input company node pair. In some embodiments, the machine learning model is configured to process the noted input features for the input company node pair to generate a predicted relationship measure for the input company node pair.

In some embodiments, the baseline predictor is the edge weight in the network. For example, if the data describes that company A has 100 employees and there have been 50 historical confirmed cases of COB between company A and company B, there is an increased likelihood of dual coverage between employees of those two companies. This could be a geographic effect which graph analytics allows the current solution to exploit in a novel way. For example, in a small town there may be two major employers so multiple cases of one spouse working for company A and the other spouse working for company B. Using geographic data in a machine learning model in this way represents a novel step in the invention. Various embodiments integrate additional features as inputs to a machine learning model. These additional features can include: physical distance between employers, company size, population size and other socio-demographic data in company location, and employer type.

II. DEFINITIONS OF CERTAIN TERMS

The term "cross-entity relationship graph data object" may refer to a data construct that describes relationships between a group of predictive entities (e.g., a group of predictive entities each associated with a company). In some embodiments, the cross-entity relationship graph data object describes a group of entity nodes each associated with a corresponding predictive entity, as well as a group of directed entity relationship edges each describing a directed relationship between a source entity node that is associated with a source predictive entity and a destination entity node that is associated with a destination predictive entity. In some embodiments, the cross-entity relationship graph data object describes a directed and complete graph, such that there is two directed relationship edges between each pair of entity nodes (i.e., there is a directed relationship edge between each ordered pair of entity nodes). For example, given the entity nodes $N_1$, $N_2$, and $N_3$, the cross-entity relationship graph data object may comprise the following cross-entity relationship edges: a directed relationship edge whose source entity node is $N_1$ and whose destination entity node is $N_2$, a directed relationship edge whose source entity node is $N_1$ and whose destination entity node is $N_3$, a directed relationship edge whose source entity node is $N_2$ and whose destination entity node is $N_3$, a directed relationship edge whose source entity node is $N_2$ and whose destination entity node is $N_1$, a directed relationship edge whose source entity node is $N_3$ and whose destination entity node is $N_1$, and a directed relationship edge whose source entity node is $N_3$ and whose destination entity node is $N_2$.

The term "entity node" may refer to a data construct that describes a component of a cross-entity relationship graph data object that describes attribute data associated with a corresponding predictive entity (e.g., a real-world entity and/or a virtual entity, such as a company entity, with respect to which one or more predictive data analysis operations are performed). In some embodiments, an entity node describes, for a corresponding predictive entity, an entity node attribute, such as an entity node attribute that describes an entity size measure for the corresponding predictive entity (e.g., a number of potential predictive indicators associated with the corresponding predictive entity, such as a number of employees of the corresponding predictive entity that may be subject to Coordination of Benefits (COB) investigations to determine whether each of the noted employees is associated with other health insurance coverage plans associated with other predictive entities). For example, when the corresponding predictive entity for an entity node describes a particular company, the entity node attribute for the entity node may describe a company size measure for the particular company, such as an employee count of the particular company. In some embodiments, an entity node is associated with one or more entity node attributes each having an entity node attribute type. In some of the noted embodiments, to generate a graph image data object for a cross-entity relationship graph data object, each entity node attribute described by the cross-entity relationship graph data object is mapped to a node visualization type for the entity node attribute type that is associated with the entity node attribute using a node visualization schema associated with the cross-entity relationship graph data object.

The term "directed relationship edge" may refer to a data construct that describes a component of a cross-entity relationship graph data object that describes attribute data associated with a directed relationship between a source predictive entity and a destination predictive entity (e.g., a relationship from a source predictive entity that is deemed to be the source/subject predictive entity for the directed relationship to a destination predictive entity that is deemed to be the destination/object predictive entity for the directed relationship). Accordingly, each directed relationship edge may be associated with a source entity node for the source predictive entity that is associated with the underlying directed relationship, and a destination entity node for the destination predictive entity that is associated with the underlying directed relationship. In some embodiments, a directed relationship edge is associated with one or more directed weight attributes, where each directed weight attribute is associated with a directed weight attribute type. In some of the noted embodiments, to generate a graph image data object for a cross-entity relationship graph data object, each directed weight attribute described by the cross-entity relationship graph data object is mapped to an edge visualization type for the directed weight attribute type that is associated with the directed weight attribute using an edge visualization schema associated with the cross-entity relationship graph data object.

The term "normalized historical contribution measure" may refer to a data construct that describes, for a directed relationship from a first predictive entity to a second predictive entity, a normalized measure of candidate predictive indicators associated with the first predictive entity that are determined to be confirmed/affirmative predictive indicators based at least in part on data describing relationships between the first predictive entity and the second predictive entity. In some embodiments, historical data associated with a set of predictive entities may describe, for each ordered pair of predictive entities comprising a source predictive entity and a destination predictive entity, a raw historical contribution measure that describes a number of potential predictive indicators associated with the source predictive entity that are associated with qualifying historical relationships with the destination predictive entity. For example, the raw historical contribution measure of a source predictive entity with respect to a destination predictive entity may describe a number of employees of the source predictive entity that are recorded to have health insurance coverage plans associated with the destination predictive entity. In some embodiments, given a source predictive entity $E_1$ and a destination predictive entity $E_2$, if the raw historical contribution measure for $E_1$ with respect to $E_2$ (e.g., the number of employees of $E_1$ that have health insurance coverage plans associated with $E_2$) is $C(E_1, E_2)$, then the normalized historical contribution measure for $E_1$ may be determined based at least in part on the output of $C(E_1,E_2)/EC_1$, where $EC_1$ is the entity size measure associated with $E_1$. In some embodiments, given a source predictive entity $E_1$ and a destination predictive entity $E_2$, and given a total of P predictive entities associated with a cross-entity relationship graph data object, if the raw historical contribution measure for $E_1$ with respect to $E_2$ (e.g., the number of employees of $E_1$ that have health insurance coverage plans associated with $E_2$) is $C(E_1, E_2)$, then the normalized historical contribution measure for $E_1$ may be determined based at least in part on the output of $$\frac{C(E_1, E_2)}{\sum_{i=2}^{P} CN(N_1, N_i)},$$

where: (i) CN(a, b) is the normalized contribution measure of a predictive entity a with respect to a predictive entity b, and (ii) i is an index variable that iterates over all of the P−1 predictive entities associated with the cross-entity relationship graph data object other than $E_1$.

In some embodiments, a cross-entity distance measure describes a direction-agnostic distance measure (e.g., a geographical distance measure, a Euclidean distance measure between two entity representations, and/or the like) associated with a pair predictive entities. In some embodiments, unlike a normalized historical contribution measure that is an attribute of a directed relationship between two predictive entities and is thus direction-aware (e.g., such that the normalized historical contribution measure of a source predictive entity with respect to a destination predictive entity may be different from the normalized historical contribution measure of the destination predictive entity with respect to the source predictive entity), the cross-entity distance measure for two predative entity is an attribute of an undirected relationship between the two predictive entities and is thus direction-aware (e.g., such that the cross-entity distance measure of a source predictive entity with respect to a destination predictive entity is the same as cross-entity distance measure of the destination predictive entity with respect to the source predictive entity). An example of a cross-entity distance measure associated with two predictive entities is a geographical distance measure and/or a travel time between company offices associated with two companies associated with the two predictive entities.

The term "hybrid graph-based processing machine learning framework" may refer to a data construct that describes parameters, hyper-parameters, and/or defined operations of a collection of one or more machine learning models (e.g., with each machine learning model comprising at least one of one or more rule-based layers or one or more layers that depend on trained parameters), where the machine learning models are collectively configured to process a cross-entity relationship graph data object that is associated with a set of E predictive entities along with optionally a node representation associated with a primary predictive entity of the E predictive entities to generate, for each predictive entity, a cross-entity relationship score with respect to the primary predictive entity. In some embodiments, the hybrid graph-based processing machine learning framework comprises a set of graph representation machine learning models that are configured to collectively generate a comprehensive representation of the cross-entity relationship graph data object, as well as one or more classification machine learning models (e.g., one or more feedforward neural network machine learning models) that are configured to process the comprehensive representation and a node representation associated with the primary predictive entity in order to generate cross-entity relationship graph data objects associated with the primary predictive entity. In some embodiments, inputs to the hybrid graph-based processing machine learning framework comprise a set of vectors and/or a matrix describing a cross-entity relationship graph and a vector identifying a primary predictive entity, while outputs of the hybrid graph-based processing machine learning framework comprise an output vector having E values, where each output value describes the cross-entity relationship score for the particular primary predictive entity with respect to one of E predictive entities. In some embodiments, the hybrid graph-based prediction machine learning framework is trained in an end-to-end fashion and based at least in part on historical data describing historical prediction labels (e.g., historical COB investigation labels) for particular predictive inputs (e.g., for particular individuals/employees/members).

The term "graph convolutional neural network machine learning model" may refer to a data construct that describes parameters, hyper-parameters, and/or defined operations of a machine learning model (e.g., a machine learning model comprising at least one of one or more rule-based layers or one or more layers that depend on trained parameters), where the machine learning model is configured to process an cross-entity relationship graph data object to generate a graph convolutional representation of the cross-entity relationship graph data object. In some embodiments, the graph convolutional neural network machine learning model comprises a set of trained Graph Neural Network (GNN) layers that are configured to process graph data associated with edge weights and/or edge attributes. Examples of such GNNs include a GNN that uses hypergraph convolution and hypergraph attention. Aspects of hypergraph convolution and hypergraph attention are described in Bai et al., Hypergraph Convolution and Hypergraph Attention, arXiv: 1901.08150v2 [cs.LG] (2020), available online at arxiv.org. In some embodiments, the graph convolutional neural network machine learning model is not capable of processing feature data associated with at least one of node attributes, edge attributes, and edge weights of the cross-entity relationship graph data object, thus in some embodiments necessitating capturing such feature data using other representation generation machine learning models. In some embodiments, inputs to a graph convolutional neural network machine learning model include a vector and/or a matrix describing an input cross-entity relationship graph data object, while outputs of a graph convolutional neural network machine learning model include a vector describing a graph convolutional representation of the noted input cross-entity relationship graph data object. In some embodiments, the graph convolutional neural network machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

The term "image-based convolutional neural network machine learning model" may refer to a data construct that describes parameters, hyper-parameters, and/or defined operations of a machine learning model (e.g., a machine learning model comprising at least one of one or more rule-based layers or one or more layers that depend on trained parameters), where the machine learning model is configured to process a graph image data object for the cross-entity relationship graph data object to generate an image-based convolutional representation of the cross-entity relationship graph data object. In some embodiments, the image-based convolutional neural network machine learning model comprises a set of two-dimensional convolutional neural network (CNN) layers. In some embodiments, the image-based convolutional neural network machine learning model is an image processing machine learning model that is configured to generate a convolutional representation of an input image. In some embodiments, the image-based convolutional neural network machine learning model comprises a residual network (ResNet) machine learning model. Aspects of ResNet machine learning models are described in Huang et al., Deep Networks with Stochastic Depth, arXiv: 1603.09382v3 [cs.LG] (2016), available online at arxiv.org. In some embodiments, inputs to an image-based convolutional neural network machine learning model include a matrix describing an input graph image data object, while outputs of an image-based convolutional neural network machine learning model include a vector describing an image-based convolutional representation of the input graph image data object. In some embodiments, the image-based convolutional neural network machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

The term "graph image data object" may refer to a data construct that describes an image representation of a graph data object. To generate an image representation of a cross-entity relationship graph data object, the following operations are performed: mapping each entity node described by the cross-entity relationship graph data object to a node icon having a defined geometric shape centered in a defined region (e.g., a defined pixel) of the image representation, mapping each directed relationship edge described by the cross-entity relationship graph to an edge line in the image representation that stretches from the node icon of the source entity node associated with the source predictive entity of the directed relationship edge to the node icon of the destination entity node associated with the destination predictive entity of the directed relationship edge, mapping each directed weight attribute (e.g., including each direction-aware weight attribute) described by the cross-entity relationship graph data object to an edge attribute visualization type for the directed weight attribute type that is associated with the directed weight attribute using an edge visualization schema associated with the cross-entity relationship graph data object, and mapping each entity node attribute described by the cross-entity relationship graph data object to a node visualization type for the entity node attribute type that is associated with the entity node attribute using a node visualization schema associated with the cross-entity relationship graph data object.

The term "feature extraction machine learning model" is configured to generate an extracted representation of the cross-entity relationship graph data object based at least in part on an extracted feature set based at least in part on the data associated with the cross-entity relationship graph data object. In some embodiments, the feature extraction machine learning model comprises one or more feedforward neural network layers. In some embodiments, inputs to the feature extraction machine learning model comprise a vector describing the extracted feature sets for an input primary predictive data entity, while outputs of the feature extraction machine learning model comprise a vector corresponding to the extracted representation of the primary predictive entity. In some embodiments, the feature extraction machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

The term "extracted feature set" may refer to a data construct that describes one or more feature values corresponding to one or more predefined feature types for the cross-entity relationship graph data object, where each predefined feature type is associated with a predefined feature extraction procedure. For example, in some embodiments, the extracted feature set comprises: (i) one or more extracted relational features determined based at least in part on a related edge subset for the primary predictive entity that comprises the group of directed entity relationship edges whose source predictive entity is the primary predictive entity, (ii) one or more extracted pairwise features determined based at least in part on a related pair subset of the group of entity pairs that comprise the primary predictive entity, and/or (iii) one or more extracted node features determined based at least in part on a related node subset of the plurality of nodes whose entity node attributes satisfy an entity node attribute similarity threshold.

The term "extracted relational feature" may refer to a data construct that describes a feature of a directed relationship edge that is in the related edge subset for a corresponding primary predictive entity. In some embodiments, the one or more extracted relational features for a primary predictive entity comprise C extracted contribution features, and each extracted weight feature describes the normalized historical contribution measure for a corresponding directed relationship edge whose corresponding normalized historical distribution measure is among top C highest normalized historical contribution measures associated with the related edge subset. For example, given three predictive entities E1, E2, and E3 associated with entity nodes N1, N2, and N3, if the predictive entity E1 is the primary predictive entity, given that the related edge subset for E1 includes the directed relationship edge from N1 to N2 and the directed relationship edge from N1 to N3, then the set of extracted relational features for E1 include the normalized contribution measure from E1 to E2 and the normalized contribution measure from the E1 to E3.

The term "extracted pairwise feature" may refer to a data construct that describes a feature of an entity pair that is in the related pair subset for a corresponding primary predictive entity. the one or more extracted pairwise features for a primary predictive entity comprise D extracted distance features, and each extracted distance feature describes a cross-entity distance measure for a corresponding entity pair whose corresponding cross-entity distance measure is among D highest cross-distance entity measures associated with the related pair subset. For example, given three predictive entities E1, E2, and E3 associated with entity nodes N1, N2, and N3, if the predictive entity E1 is the primary predictive entity, given that the related pair subset for E1 includes the entity pair comprising E1 and E2 and the entity pair comprising E1 and E3, then the extracted pairwise features for E1 include the cross-entity distance measure for E1 and E2 and the cross-entity distance measure for E1 and E3.

The term "extracted node feature" may refer to a data construct that describes a feature of an entity node that is in the related node subset for a corresponding primary predictive entity. For example, given three predictive entities E1, E2, and E3 associated with entity nodes N1, N2, and N3 that are in turn associated with entity node attribute vectors V1, V2, and V3, if the predictive entity E1 is the primary predictive entity, and if a measure of similarity (e.g., a cosine measure of similarity) of V1 and V2 satisfies (e.g., exceeds) the an entity node attribute threshold but a measure of similarity of V2 and V3 does not, then given that the related node subset for E1 comprises N2, the extracted node features for E1 may include the entity size measure for E1.

The term "representation aggregation machine learning model" may refer to a data construct that describes parameters, hyper-parameters, and/or defined operations of a machine learning model (e.g., a machine learning model comprising at least one of one or more rule-based layers or one or more layers that depend on trained parameters), where the machine learning model is configured to combine (e.g., concatenate) that are configured to process the independent graph representations for the cross-entity relationship graph data object to generate the comprehensive representation for the cross-entity relationship graph data object. In some embodiments, the representation aggregation machine learning model comprises one or more feedforward neural network layers that are configured to process the independent graph representations to generate the comprehensive representation. In some embodiments, inputs to the representation aggregation machine learning model include either a vector describing a concatenated representation of the various independent graph representations of an input cross-entity relationship graph data object or various vectors each describing a separate independent graph representation of an input cross-entity relationship graph data object, while outputs of the representation aggregation machine learning model include a vector describing a comprehensive representation of the input cross-entity relationship graph data object. In some embodiments, the representation aggregation machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

The term "node representation generation machine learning model" may refer to a data construct that describes parameters, hyper-parameters, and/or defined operations of a machine learning model (e.g., a machine learning model comprising at least one of one or more rule-based layers or one or more layers that depend on trained parameters), where the machine learning model is configured to process one or more entity node features (e.g., the extracted feature set) for the primary predictive entity to generate the node representation for the entity node that is associated with the primary predictive node that is in turn associated with the primary predictive entity. In some embodiments, the node representation generation machine learning model comprises one or more feedforward neural network layers. In some embodiments, inputs to the node representation generation machine learning model comprise a vector describing the entity node features for an input primary predictive entity, while outputs of the node representation generation machine learning model comprise a vector corresponding to the node representation for the input primary predictive entity. In some embodiments, the node representation generation machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members). In some embodiments, the feature extraction machine learning model is utilized as a node representation generation machine learning model, and the extracted representation is adopted as the node representation. In some embodiments, inputs to the node representation generation machine learning model include the extracted feature set generated by the feature extraction machine learning model described above. In some embodiments, the node representation for a primary entity node merely describes a unique numeric identifier of the corresponding primary predictive entity.

The term "feedforward neural network machine learning model" may refer to a data construct that describes parameters, hyper-parameters, and/or defined operations of a machine learning model (e.g., a machine learning model comprising at least one of one or more rule-based layers or one or more layers that depend on trained parameters), where the machine learning model is configured to generate the cross-entity relationship scores based at least in part on the comprehensive representation and the node representation. Each cross-entity relationship score may be associated with a particular predictive entity and describes a predicted measure of relationship (e.g., a predicted COB investigation success likelihood measure, a predicted COB investigation utility measure, and/or the like) for the primary predictive entity and the particular predictive entity. For example, if the primary predictive entity is associated with a Company A, then a cross-entity relationship score for a particular predictive entity that is associated with a Company B may describe a predicted likelihood that an employee of a Company A may have conflicting insurance with an insurance provide by Company B (e.g., through familial connections, such as spousal insurance coverage). In some embodiments, given E predictive entities, during each inferential execution (i.e., during each model execution "pass") that is associated with a particular primary predictive entity, one or more feedforward neural network layers of the feedforward neural network machine learning model are configured to process the comprehensive representation of the cross-entity relationship graph data object (which may be a vector) and the node representation associated with the entity node of the particular primary predictive entity (which may also be a vector) to generate an output vector having E values, where each output value describes the cross-entity relationship score for the particular primary predictive entity with respect to one of the E predictive entities. In some embodiments, the feedforward neural network machine learning model comprises one or more feedforward neural network layers. In some embodiments, the representation aggregation machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members). In some embodiments, the feedforward neural network machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

FIG. 1 is a schematic diagram of an example system architecture 100 for performing predictive data analysis operations and for performing one or more prediction-based actions (e.g., generating corresponding user interface data). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to a generate a predicted coordination of benefits (COB) score for a particular individual that is associated with (e.g., employed by) a particular company.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to train a prediction model (e.g., feature processing machine learning models, eligibility prediction machine learning models, per-feature-type processing machine learning models, and/or cross-feature-type machine learning models) based at least in part on the training data store 122 stored in the storage subsystem 108, store trained prediction models as part of the model definition data store 121 stored in the storage subsystem 108, utilize trained models to generate predictions based at least in part on structured feature data that may be provided by an external computing entity 102, and perform prediction-based actions based at least in part on the generated predictions. The storage subsystem may be configured to store the model definition data store 121 for one or more predictive analysis models and the training data store 122 uses to train one or more predictive analysis models. The predictive data analysis computing entity 106 may be configured to receive requests and/or data from external computing entities 102, process the requests and/or data to generate predictive outputs (e.g., predictive data analysis data objects), and provide the predictive outputs to the external computing entities 102. The external computing entity 102 may periodically update/provide raw input data (e.g., structured feature data) to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a predictive analysis engine 110 and a training engine 112. The predictive analysis engine 110 may be configured to perform predictive data analysis based at least in part on a received user feature data object. For example, the predictive analysis engine 110 may be configured to one or more prediction based actions based at least in part on a fall likelihood prediction. The training engine 112 may be configured to train the predictive analysis engine 110 in accordance with the training data store 122 stored in the storage subsystem 108.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention make important technical contributions to improving predictive accuracy of graph-based prediction machine learning models, which in turn improves training speed and training efficiency of training graph-based prediction machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training graph-based prediction machine learning models, thus reducing the number of computational operations needed and/or the amount of training data entries needed to train graph-based prediction machine learning models. Accordingly, the techniques described herein improve at least one of the computational efficiency, storage-wise efficiency, and speed of training graph-based prediction machine learning models.

FIG. 4 is a flowchart diagram of an example process 400 for generating a graph-based prediction for a primary predictive entity of E predictive entities using a hybrid graph-based processing machine learning framework. Via the various steps/operations of the process 400, the predictive data analysis computing entity 106 can augment predictive inferences generated by graph convolutional neural network machine learning models with predictive inferences generated by other machine learning models to overcome the limitations of existing graph convolutional neural network machine learning models and to holistically process feature data described by complex graph data objects.

The process 400 begins at step/operation 401 when the predictive data analysis computing entity 106 identifies a cross-entity relationship graph data object that is associated with the plurality of predictive entities. In some embodiments, the predictive data analysis computing entity 106 retrieves the cross-entity relationship graph data object from a database stored by the storage subsystem and by interacting with a database management system associated with the noted database. In some embodiments, the described database stores data using at least one of a relational data model, an object-oriented data model, a graph-based data model, and/or the like.

In some embodiments, a cross-entity relationship graph data object describes relationships between a group of predictive entities (e.g., a group of predictive entities each associated with a company). In some embodiments, the cross-entity relationship graph data object describes a group of entity nodes each associated with a corresponding predictive entity, as well as a group of directed entity relationship edges each describing a directed relationship between a source entity node that is associated with a source predictive entity and a destination entity node that is associated with a destination predictive entity. In some embodiments, the cross-entity relationship graph data object describes a directed and complete graph, such that there is two directed relationship edges between each pair of entity nodes (i.e., there is a directed relationship edge between each ordered pair of entity nodes). For example, given the entity nodes $N_1$, $N_2$, and $N_3$, the cross-entity relationship graph data object may comprise the following cross-entity relationship edges: a directed relationship edge whose source entity node is $N_1$ and whose destination entity node is $N_2$, a directed relationship edge whose source entity node is $N_1$ and whose destination entity node is $N_3$, a directed relationship edge whose source entity node is $N_2$ and whose destination entity node is $N_3$, a directed relationship edge whose source entity node is $N_2$ and whose destination entity node is $N_1$, a directed relationship edge whose source entity node is $N_3$ and whose destination entity node is $N_1$, and a directed relationship edge whose source entity node is $N_3$ and whose destination entity node is $N_2$.

In some embodiments, an entity node is a component of a cross-entity relationship graph data object that describes attribute data associated with a corresponding predictive entity (e.g., a real-world entity and/or a virtual entity, such as a company entity, with respect to which one or more predictive data analysis operations are performed). In some embodiments, an entity node describes, for a corresponding predictive entity, an entity node attribute, such as an entity node attribute that describes an entity size measure for the corresponding predictive entity (e.g., a number of potential predictive indicators associated with the corresponding predictive entity, such as a number of employees of the corresponding predictive entity that may be subject to Coordination of Benefits (COB) investigations to determine whether each of the noted employees is associated with other health insurance coverage plans associated with other predictive entities). For example, when the corresponding predictive entity for an entity node describes a particular company, the entity node attribute for the entity node may describe a company size measure for the particular company, such as an employee count of the particular company. In some embodiments, an entity node is associated with one or more entity node attributes each having an entity node attribute type. In some of the noted embodiments, to generate a graph image data object for a cross-entity relationship graph data object, each entity node attribute described by the cross-entity relationship graph data object is mapped to a node visualization type for the entity node attribute type that is associated with the entity node attribute using a node visualization schema associated with the cross-entity relationship graph data object.

In some embodiments, a directed relationship edge is a component of a cross-entity relationship graph data object that describes attribute data associated with a directed relationship between a source predictive entity and a destination predictive entity (e.g., a relationship from a source predictive entity that is deemed to be the source/subject predictive entity for the directed relationship to a destination predictive entity that is deemed to be the destination/object predictive entity for the directed relationship). Accordingly, each directed relationship edge may be associated with a source entity node for the source predictive entity that is associated with the underlying directed relationship, and a destination entity node for the destination predictive entity that is associated with the underlying directed relationship. In some embodiments, a directed relationship edge is associated with one or more directed weight attributes, where each directed weight attribute is associated with a directed weight attribute type. In some of the noted embodiments, to generate a graph image data object for a cross-entity relationship graph data object, each directed weight attribute described by the cross-entity relationship graph data object is mapped to an edge visualization type for the directed weight attribute type that is associated with the directed weight attribute using an edge visualization schema associated with the cross-entity relationship graph data object.

In some embodiments, a directed weight attribute is a direction-aware attribute of a directed relationship edge between a source entity node and a destination entity node, such as a directed weight attribute that describes a normalized historical contribution measure of the source predictive entity associated with the source entity node with respect to the destination entity node associated with the destination predictive entity. In some embodiments, a directed weight attribute for two entity node is a direction-aware attribute, as the directed weight attribute of a directed relationship edge from a first entity node to a second entity node may be different from the directed weight of a directed relationship edge from the second entity node to the first entity node. In some embodiments, a directed weight attribute for a directed relationship edge between a source entity node and a destination entity node is determined based at least in part on one or more directed relationship attributes for a directed relationship between the source predictive entity that is associated with the source entity node and the destination predictive entity that is associated with the destination entity node. An example of a directed relationship attribute is a normalized historical contribution measure, as further described below.

In some embodiments, a normalized historical contribution measure describes, for a directed relationship from a first predictive entity to a second predictive entity, a normalized measure of candidate predictive indicators associated with the first predictive entity that are determined to be confirmed/affirmative predictive indicators based at least in part on data describing relationships between the first predictive entity and the second predictive entity. In some embodiments, historical data associated with a set of predictive entities may describe, for each ordered pair of predictive entities comprising a source predictive entity and a destination predictive entity, a raw historical contribution measure that describes a number of potential predictive indicators associated with the source predictive entity that are associated with qualifying historical relationships with the destination predictive entity. For example, the raw historical contribution measure of a source predictive entity with respect to a destination predictive entity may describe a number of employees of the source predictive entity that are recorded to have health insurance coverage plans associated with the destination predictive entity. In some embodiments, given a source predictive entity $E_1$ and a destination predictive entity $E_2$, if the raw historical contribution measure for $E_1$ with respect to $E_2$ (e.g., the number of employees of $E_1$ that have health insurance coverage plans associated with $E_2$) is $C(E_1, E_2)$, then the normalized historical contribution measure for $E_1$ may be determined based at least in part on the output of $C(E_1,E_2)/EC_1$, where $EC_1$ is the entity size measure associated with $E_1$. In some embodiments, given a source predictive entity $E_1$ and a destination predictive entity $E_2$, and given a total of P predictive entities associated with a cross-entity relationship graph data object, if the raw historical contribution measure for $E_1$ with respect to $E_2$ (e.g., the number of employees of $E_1$ that have health insurance coverage plans associated with $E_2$) is $C(E_1, E_2)$, then the normalized historical contribution measure for $E_1$ may be determined based at least in part on the output of $$\frac{C(E_1, E_2)}{\sum_{i=2}^{P} CN(N_1, N_i)},$$

where: (i) CN(a, b) is the normalized contribution measure of a predictive entity a with respect to a predictive entity b, and (ii) i is an index variable that iterates over all of the P−1 predictive entities associated with the cross-entity relationship graph data object other than $E_1$.

For example, consider an exemplary case in which three predictive entities corresponding to three companies referred to as Company A, Company B, and Company C are mapped to a cross-entity relationship graph data object, where: (i) Company A is associated with 50 employees, with 50 employees having a health insurance coverage plan that is associated with Company B and 25 having a health insurance coverage that is associated with Company C, (ii) Company B is associated with 60 employees, with 60 employees having a health insurance coverage plan that is associated with Company A and 15 having a health insurance coverage that is associated with Company C, and (iii) Company C is associated with 100 employees, with 50 employees having a health insurance coverage plan that is associated with Company A and 60 having a health insurance coverage that is associated with Company B. In this example, the following normalized historical contribution measures may be computed: CN(A,B)=1.0, CN(A,C)=0.5, CN(B,A)=1.0, CN(B,C)=0.25, CN(C,A)=0.5, and CN(C,B)=0.6.

As shown by the above example, in some embodiments, an entity size measure for a corresponding predictive entity, which may be used to determine an entity node attribute for a corresponding entity node that is associated with the corresponding predictive entity, and normalized contribution measures for the corresponding predictive entity, which may be used to determine directed weight attributes for directed relationship edges that originate from the corresponding predictive entity (i.e., for directed relationship edges that are associated with the corresponding predictive entity as their respective source predictive entity), are related in that the normalized contribution measure for a directed relationship that originates from a particular predictive entity is determined as a confirmed/affirmative share of candidate predictive indicators for the particular predictive entity, where the total count of the candidate predictive indicators for the particular predictive entity is indicated by the entity size measure for the particular predictive entity. For example, in some embodiments, a normalized contribution measure for a directed relationship between a source company and a destination company is determined based at least in part on a confirmed/affirmative share of employees of the source company that have health insurance coverage intersections with the destination company, where the total count of employees of the source company is indicated by the entity size measure for the source company. This relationship indicates that the entity size measures and directed weight attributes of a cross-entity relationship graph data object are deemed semantically/conceptually related, such that a comprehensive representation of the cross-entity relationship data object should reflect not only entity size measures and directed weight attributes in isolation, but also the interrelationships of the entity size measures and the directed weight attributes.

In some embodiments, a cross-entity distance measure describes a direction-agnostic distance measure (e.g., a geographical distance measure, a Euclidean distance measure between two entity representations, and/or the like) associated with a pair predictive entities. In some embodiments, unlike a normalized historical contribution measure that is an attribute of a directed relationship between two predictive entities and is thus direction-aware (e.g., such that the normalized historical contribution measure of a source predictive entity with respect to a destination predictive entity may be different from the normalized historical contribution measure of the destination predictive entity with respect to the source predictive entity), the cross-entity distance measure for two predative entity is an attribute of an undirected relationship between the two predictive entities and is thus direction-aware (e.g., such that the cross-entity distance measure of a source predictive entity with respect to a destination predictive entity is the same as cross-entity distance measure of the destination predictive entity with respect to the source predictive entity). An example of a cross-entity distance measure associated with two predictive entities is a geographical distance measure and/or a travel time between company offices associated with two companies associated with the two predictive entities.

As described above, given a set of predictive entities, the set of predictive entities may be associated with the following data types: (i) for each predictive entity, a set of predictive entity attributes such as an entity size measure, (ii) for each directed relationship between a source predictive entity with respect to a destination predictive entity, a set of directed relationship attributes such as a normalized historical contribution measure for the source predictive entity with respect to the predictive entity, and (iii) for each entity pair comprising (i.e., for each undirected relationship between) a first predictive entity and a second predictive entity, a set of entity pair attributes such as a cross-entity distance measure for the first predictive entity and the second predictive entity. In some of the noted embodiments, the cross-entity relationship graph data object is determined by generating: (i) for each predictive entity, an entity node, (ii) for each entity node that is associated with a corresponding predictive entity, a set of X entity node attributes determined based at least in part on the set of predictive entity attributes associated with the corresponding predictive entity for the entity node, (iii) for each directed relationship, a directed relationship edge, (iv) for each directed relationship edge that is associated with a corresponding directed relationship, a set of Y direction-aware weight attributes based at least in part on the set of directed relationship attributes associated with the corresponding directed relationship for the directed relationship edge, (v) for each entity pair, a set of Z direction-agnostic distance attributes determined based at least in part on the set of entity pair attributes for the noted entity pair.

For example, given two predictive entities $E_1$ and $E_2$, where $E_1$ is associated with an entity size measure of 20, $E_2$ is associated with an entity size measure of 100, $E_1$ has a normalized contribution measure of 0.20 with respect to $E_2$, $E_2$ has a normalized contribution measure of 0.50 with respect to $E_1$, and the cross-entity distance measure for $E_1$ and $E_2$ is 1550, the cross-entity relationship graph data object 500 may have the form that is depicted in FIG. 5A. The cross-entity relationship graph data object 500 stores the cross-entity distance measure as an attribute of the objects 501-502 associated with the two directed relationship edges associated with the two predictive entities.

As another example, given two predictive entities $E_1$ and $E_2$, where $E_1$ is associated with an entity size measure of 20, $E_2$ is associated with an entity size measure of 100, $E_1$ has a normalized contribution measure of 0.20 with respect to $E_2$, $E_2$ has a normalized contribution measure of 0.50 with respect to $E_1$, and the cross-entity distance measure for $E_1$ and $E_2$ is 1550, the cross-entity relationship graph data object 550 may have the form that is depicted in FIG. 5B. The cross-entity relationship graph data object 500 stores the cross-entity distance measure as an attribute of an entity pair object 551.

Returning to FIG. 4, at step/operation 402, the predictive data analysis computing entity 106 processes the cross-entity relationship graph data object using the hybrid graph-based processing machine learning framework to generate a related subset of the E predictive entities for the primary predictive entities. As described above, the hybrid graph-based processing machine learning framework may be configured to generate a diverse number of representations of a cross-entity relationship graph data object and use those representations to identify, for each predictive entity of the E predictive entities, a cross-entity relationship score for the predictive entity with respect to the primary predictive entity that describes a likelihood that the predictive entity is a valid investigatory object for an input investigation data object that is associated with the primary predictive entity.

In some embodiments, the hybrid graph-based processing machine learning framework is configured to process a cross-entity relationship graph data object that is associated with a set of E predictive entities along with optionally a node representation associated with a primary predictive entity of the E predictive entities to generate, for each predictive entity, a cross-entity relationship score with respect to the primary predictive entity. In some embodiments, the hybrid graph-based processing machine learning framework comprises a set of graph representation machine learning models that are configured to collectively generate a comprehensive representation of the cross-entity relationship graph data object, as well as one or more classification machine learning models (e.g., one or more feedforward neural network machine learning models) that are configured to process the comprehensive representation and a node representation associated with the primary predictive entity in order to generate cross-entity relationship graph data objects associated with the primary predictive entity.

In some embodiments, the hybrid graph-based processing machine learning framework 600 has the architecture that is depicted in FIG. 6. As depicted in FIG. 6, the hybrid graph-based processing machine learning framework 600 comprises: (i) a set of graph representation machine learning models 601 that are collectively configured to process a cross-entity relationship graph data object 611 to generate a comprehensive representation 612, and (ii) a set of classification machine learning models 602 that are collectively configured to process the comprehensive representation 612 to generate the cross-entity relationship scores 613.

In some embodiments, the set of graph representation machine learning models 601 comprise: (i) a set of representation generation machine learning models (e.g., a set of machine learning models whose operations can be performed in parallel to each other), where each machine learning model is configured to process the cross-entity relationship graph data object 611 to generate a respective independent graph representation, and (ii) a representation aggregation machine learning model that is configured to combine the independent graph representations generated by the set of representation generation machine learning models to generate the comprehensive representation 612. In some embodiments, the set of classification machine learning models 602 comprise a node representation generation machine learning model that is configured to generate a node representation for an entity node associated with the primary predictive node and a feedforward neural network machine learning model that is configured to generate the cross-entity relationship scores 613 based at least in part on the comprehensive representation 612 and the node representation.

In some embodiments, the set of graph representation machine learning models 601 of the hybrid graph-based processing machine learning framework 600 has the architecture that is depicted in FIG. 7. As depicted in FIG. 7, the set of graph representation machine learning models 601 comprise: (i) a set of representation generation machine learning models 701 (e.g., a set of machine learning models whose operations can be performed in parallel to each other), where each machine learning model is configured to process the cross-entity relationship graph data object 611 to generate a respective independent graph representation, and (ii) a representation aggregation machine learning model 702 that is configured to combine the independent graph representations 712 generated by the set of representation generation machine learning models to generate the comprehensive representation 612.

In particular, as depicted in FIG. 7, the set of representation generation machine learning models 701 comprise a graph convolutional neural network machine learning model 701A, an image-based convolutional neural network machine learning model 701B, and a feature extraction machine learning model 701C. In some embodiments, the graph convolutional neural network machine learning model 701A is configured to process the cross-entity relationship graph data object 611 to generate a graph convolutional representation 712A of the cross-entity relationship graph data object 611. In some embodiments, the graph convolutional neural network machine learning model comprises a set of trained Graph Neural Network (GNN) layers that are configured to process graph data associated with edge weights and/or edge attributes. Examples of such GNNs include a GNN that uses hypergraph convolution and hypergraph attention. Aspects of hypergraph convolution and hypergraph attention are described in Bai et al., Hypergraph Convolution and Hypergraph Attention, arXiv:1901.08150v2 [cs.LG] (2020), available online at arxiv.org. In some embodiments, the graph convolutional neural network machine learning model 701A is not capable of processing feature data associated with at least one of node attributes, edge attributes, and edge weights of the cross-entity relationship graph data object 611, thus in some embodiments necessitating capturing such feature data using other representation generation machine learning models. In some embodiments, inputs to a graph convolutional neural network machine learning model include a vector and/or a matrix describing an input cross entity relationship graph data object, while outputs of a graph convolutional neural network machine learning model include a vector describing a graph convolutional representation of the noted input cross-entity relationship graph data object. In some embodiments, the graph convolutional neural network machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

In some embodiments, the image-based convolutional neural network machine learning model 701B is configured to process a graph image data object for the cross-entity relationship graph data object 611 to generate an image-based convolutional representation 712B of the cross-entity relationship graph data object 611. In some embodiments, the image-based convolutional neural network machine learning model 701B comprises a set of two-dimensional convolutional neural network (CNN) layers. In some embodiments, the image-based convolutional neural network machine learning model 701B is an image processing machine learning model that is configured to generate a convolutional representation of an input image. In some embodiments, the image-based convolutional neural network machine learning model 701B comprises a residual network (ResNet) machine learning model. Aspects of ResNet machine learning models are described in Huang et al., Deep Networks with Stochastic Depth, arXiv:1603.09382v3 [cs.LG] (2016), available online at arxiv.org. In some embodiments, inputs to an imagebased convolutional neural network machine learning model 701B include a matrix describing an input graph image data object, while outputs of an image-based convolutional neural network machine learning model 701B include a vector describing an imagebased convolutional representation of the input graph image data object. In some embodiments, the image-based convolutional neural network machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

As described above, in some embodiments, the image-based convolutional neural network machine learning model 701B is configured to process a graph image data object of a cross-entity graph relational data object. The graph image data object may describe an image representation of a graph data object. To generate an image representation of a cross-entity relationship graph data object, the following operations are performed: mapping each entity node described by the cross-entity relationship graph data object to a node icon having a defined geometric shape centered in a defined region (e.g., a defined pixel) of the image representation, mapping each directed relationship edge described by the cross-entity relationship graph to an edge line in the image representation that stretches from the node icon of the source entity node associated with the source predictive entity of the directed relationship edge to the node icon of the destination entity node associated with the destination predictive entity of the directed relationship edge, mapping each directed weight attribute (e.g., including each direction-aware weight attribute) described by the cross-entity relationship graph data object to an edge attribute visualization type for the directed weight attribute type that is associated with the directed weight attribute using an edge visualization schema associated with the cross-entity relationship graph data object, and mapping each entity node attribute described by the cross-entity relationship graph data object to a node visualization type for the entity node attribute type that is associated with the entity node attribute using a node visualization schema associated with the cross-entity relationship graph data object.

In some embodiments, generating a graph image data object for a cross-entity relationship graph data object is performed in accordance with the process 800 of FIG. 8. The process 800 of FIG. 8 begins at step/operation 801 when the predictive data analysis computing entity 106 generates, for each entity node described by the cross-entity relationship graph data object, a node icon. In some embodiments, each node icon has a defined geometric shape (e.g., a circular geometric shape), where the defined geometric shape of a node icon may be determined based at least in part on the entity type of the predictive entity associated with the corresponding entity node for the node icon (e.g., a node icon for a hospital predictive entity may have a square geometric shape, a node icon for a law firm predictive entity may have a circular geometric shape, and/or the like). In some embodiments, the center of the geometric shape of a node icon may be a defined region (e.g., pixel) of the image representation described by the graph image data object. For example, in some embodiments, a geographic region of E locations associated with E predictive entities is mapped to the image representation described by the graph image data object, and the E centers of the E geometric shapes corresponding to the E predictive entities are generated by mapping each location of the E location to a corresponding region (e.g., pixel) of the image representation using a geographic mapping model that maps each geographic location in the geographic region to a corresponding image region of the image representation. Accordingly, in some embodiments, the locations of the node icons in an image representation may be representative of geographic locations of respective predictive entities for the entity nodes that are associated with the node icons.

At step/operation 802, the predictive data analysis computing entity 106 generates, for each directed relationship edge from a source predictive entity to a destination predictive entity, an edge line that points from the node icon associated with the source entity node for the source predictive entity to the node icon associated with the destination entity node for the destination predictive entity. In some embodiments, each edge line is a line with a pointed arrow on the end of the edge line that connects to the node icon associated with the destination entity node for the destination predictive entity associated with the corresponding directed relationship edge. In some embodiments, the length of an edge line for a directed relationship edge from a source predictive entity to a destination predictive entity is determined based at least in part on at least one direction-agnostic distance attribute associated with an entity pair comprising the source predictive entity and the destination predictive entity, such as based at least in part on the cross-entity distance measure for the entity pair comprising the source predictive entity and the destination predictive entity. For example, in some embodiments, given two edge lines between two node icons (i.e., with a first edge line being from the first node icon to the second node icon, and the second edge line being from the second node icon to the first node icon), both of the two edge lines have an identical length that is determined based at least in part on at least one direction-agnostic distance attribute associated with an entity pair comprising the source predictive entity and the destination predictive entity, such as based at least in part on the cross-entity distance measure for the entity pair comprising the source predictive entity and the destination predictive entity.

At step/operation 803, the predictive data analysis computing entity 106 updates each node icon based at least in part on one or more node visualization parameters for the node icon, where the node visualization parameters of a node icon may be determined based at least in part on one or more entity node attributes associated with the entity node attribute that is associated with the node icon. For example, in some embodiments, the size of a node icon (e.g., the radius of a circular node icon) may be determined based at least in part on an entity node attribute for the corresponding entity node that is determined based at least in part on the entity size measure associated with the predictive entity that is associated with the entity node. Accordingly, in some embodiments, the sizes of node icons may be representative of entity size measures of predictive entities associated with the corresponding entity nodes, such that (for example) the size of a node icon for an entity node that is associated with a predictive entity having a larger entity size measure may be larger than the size of a node icon for an entity that is associated with a predictive entity having a smaller entity size measure. In some embodiments, given V entity node attribute types, each entity node attribute type may be mapped to a node visualization type using a node visualization schema. For example, while entity node attributes related to entity size measures may be mapped to node visualization types associated with sizes of entity nodes, entity node attributes related to entity types (e.g., related to industries associated with the predictive entities) may be mapped to node visualization types associated with geometric shapes of entity nodes (e.g., such that node icons for predictive entities of a first industry may be circular, node icons for predictive entities of a second industry may be rectangular, and/or the like).

At step/operation 804, the predictive data analysis computing entity 106 updates each edge line based at least in part on one or more edge visualization parameters for the edge line, where the edge visualization parameters of an edge line may be determined based at least in part on one or more direction-aware weight attributes associated with the directed relationship that corresponds to the edge line. For example, in some embodiments, the thickness of an edge line may be determined based at least in part on a direction-aware weight attribute of a corresponding directed relationship edge that is determined based at least in part on a normalized historical contribution measure of the source predictive entity associated with the directed relationship edge to the destination predictive entity associated with the directed relationship edge, such that (for example) the edge line for a directed relationship edges that has a higher normalized historical contribution measure may be thicker than the edge line for a directed relationship edges that has a lower normalized historical contribution measure. In some embodiments, given W direction-aware weight attribute types, each direction-aware weight attribute type is mapped to an edge attribute visualization type based at least in part on an edge visualization schema. For example, while direction-aware weight attributes related to normalized contribution measures may be mapped to an edge attribute visualization type related to edge line thickness, direction-aware weight attributes related to commercial transaction level between predictive entities may be mapped to edge line colors (e.g., such that, given more commercial transactions in which a source predictive entity is the seller and a destination predictive entity is the buyer, then the edge line from the node icon associated with the source predictive entity to the node icon associated with the destination predictive entity is redder).

Returning to FIG. 7, in some embodiments, the feature extraction machine learning model 701C is configured to generate an extracted representation 712C of the cross-entity relationship graph data object 611 based at least in part on an extracted feature set based at least in part on the data associated with the cross-entity relationship graph data object 611. In some embodiments, the feature extraction machine learning model 701C comprises one or more feed-forward neural network layers. In some embodiments, inputs to the feature extraction machine learning model 701C comprise a vector describing the extracted feature sets for an input primary predictive data entity, while outputs of the feature extraction machine learning model 701C comprise a vector corresponding to the extracted representation of the primary predictive entity. In some embodiments, the feature extraction machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

In some embodiments, the extracted feature set comprises one or more feature values corresponding to one or more predefined feature types for the cross-entity relationship graph data object, where each predefined feature type is associated with a predefined feature extraction procedure. For example, in some embodiments, the extracted feature set comprises: (i) one or more extracted relational features determined based at least in part on a related edge subset for the primary predictive entity that comprises the group of directed entity relationship edges whose source predictive entity is the primary predictive entity, (ii) one or more extracted pairwise features determined based at least in part on a related pair subset of the group of entity pairs that comprise the primary predictive entity, and/or (iii) one or more extracted node features determined based at least in part on a related node subset of the plurality of nodes whose entity node attributes satisfy an entity node attribute similarity threshold.

In some embodiments, given a particular primary predictive entity (e.g., the company of a target individual/member), all of the directed entity relationship edges that originate from the entity node for the primary predictive entity are identified as the related edge subset for the primary predictive entity, all of the entity pairs that involve the entity node for the primary predictive entity are identified as the related pair subset for the primary predictive entity, and all of entity nodes whose entity node attributes are deemed sufficiently similar to the entity node attributes of the entity node associated with the primary predictive entity are identified as the related node subset for the primary predictive entity. For example, given three predictive entities E1, E2, and E3 associated with entity nodes N1, N2, and N3 that are in turn associated with entity node attribute vectors V1, V2, and V3, if the predictive entity E1 is the primary predictive entity, and if a measure of similarity (e.g., a cosine measure of similarity) of V1 and V2 satisfies (e.g., exceeds) the an entity node attribute threshold but a measure of similarity of V2 and V3 does not, then the related edge subset for E1 includes the directed relationship edge from N1 to N2 and the directed relationship edge from N1 to N3, the related pair subset for E1 includes the entity pair comprising E1 and E2 and the entity pair comprising E1 and E3, and the related node subset comprises N2.

In some embodiments, an extracted relational feature is a feature of a directed relationship edge that is in the related edge subset for a corresponding primary predictive entity. In some embodiments, the one or more extracted relational features for a primary predictive entity comprise C extracted contribution features, and each extracted weight feature describes the normalized historical contribution measure for a corresponding directed relationship edge whose corresponding normalized historical distribution measure is among top C highest normalized historical contribution measures associated with the related edge subset. For example, given three predictive entities E1, E2, and E3 associated with entity nodes N1, N2, and N3, if the predictive entity E1 is the primary predictive entity, given that the related edge subset for E1 includes the directed relationship edge from N1 to N2 and the directed relationship edge from N1 to N3, then the set of extracted relational features for E1 include the normalized contribution measure from E1 to E2 and the normalized contribution measure from the E1 to E3.

In some embodiments, an extracted pairwise feature is a feature of an entity pair that is in the related pair subset for a corresponding primary predictive entity. the one or more extracted pairwise features for a primary predictive entity comprise D extracted distance features, and each extracted distance feature describes a cross-entity distance measure for a corresponding entity pair whose corresponding cross-entity distance measure is among D highest cross-distance entity measures associated with the related pair subset. For example, given three predictive entities E1, E2, and E3 associated with entity nodes N1, N2, and N3, if the predictive entity E1 is the primary predictive entity, given that the related pair subset for E1 includes the entity pair comprising E1 and E2 and the entity pair comprising E1 and E3, then the extracted pairwise features for E1 include the cross-entity distance measure for E1 and E2 and the cross-entity distance measure for E1 and E3.

In some embodiments, an extracted node feature is a feature of an entity node that is in the related node subset for a corresponding primary predictive entity. For example, given three predictive entities E1, E2, and E3 associated with entity nodes N1, N2, and N3 that are in turn associated with entity node attribute vectors V1, V2, and V3, if the predictive entity E1 is the primary predictive entity, and if a measure of similarity (e.g., a cosine measure of similarity) of V1 and V2 satisfies (e.g., exceeds) the an entity node attribute threshold but a measure of similarity of V2 and V3 does not, then given that the related node subset for E1 comprises N2, the extracted node features for E1 may include the entity size measure for E1.

In some embodiments, the representation aggregation machine learning model 702 is configured to combine (e.g., concatenate) that are configured to process the independent graph representations 712 for the cross-entity relationship graph data object 611 to generate the comprehensive representation 612 for the cross-entity relationship graph data object 611. In some embodiments, the representation aggregation machine learning model 702 comprises one or more feedforward neural network layers that are configured to process the independent graph representations 712 to generate the comprehensive representation 612. In some embodiments, inputs to the representation aggregation machine learning model 702 include either a vector describing a concatenated representation of the various independent graph representations of an input cross-entity relationship graph data object or various vectors each describing a separate independent graph representation of an input cross-entity relationship graph data object, while outputs of the representation aggregation machine learning model 702 include a vector describing a comprehensive representation of the input cross-entity relationship graph data object. In some embodiments, the representation aggregation machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

Returning to FIG. 6, the hybrid graph-based processing machine learning framework 600 comprises a set of classification machine learning models 602 that are collectively configured to process the comprehensive representation 612 to generate the cross-entity relationship scores 613. As depicted in FIG. 9, the set of classification machine learning models 602 comprise a node representation generation machine learning model 901 that is configured to generate a node representation 911 for an entity node associated with the primary predictive node and a feedforward neural network machine learning model 902 that is configured to generate the cross-entity relationship scores 613 based at least in part on the comprehensive representation 612 and the node representation 911.

In some embodiments, the node representation generation machine learning model 901 is configured to process one or more entity node features (e.g., the extracted feature set) for the primary predictive entity to generate the node representation 911 for the entity node that is associated with the primary predictive node that is in turn associated with the primary predictive entity. In some embodiments, the node representation generation machine learning model 901 comprises one or more feedforward neural network layers. In some embodiments, inputs to the node representation generation machine learning model 901 comprise a vector describing the entity node features for an input primary predictive entity, while outputs of the node representation generation machine learning model 901 comprise a vector corresponding to the node representation for the input primary predictive entity. In some embodiments, the node representation generation machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members). In some embodiments, the feature extraction machine learning model is utilized as a node representation generation machine learning model, and the extracted representation is adopted as the node representation. In some embodiments, inputs to the node representation generation machine learning model 901 include the extracted feature set generated by the feature extraction machine learning model described above.

In some embodiments, the feedforward neural network machine learning model 902 that is configured to generate the cross-entity relationship scores 613 based at least in part on the comprehensive representation 612 and the node representation 911. Each cross-entity relationship score may be associated with a particular predictive entity and describes a predicted measure of relationship (e.g., a predicted COB investigation success likelihood measure, a predicted COB investigation utility measure, and/or the like) for the primary predictive entity and the particular predictive entity. For example, if the primary predictive entity is associated with a Company A, then a cross-entity relationship score for a particular predictive entity that is associated with a Company B may describe a predicted likelihood that an employee of a Company A may have conflicting insurance with an insurance provide by Company B (e.g., through familial connections, such as spousal insurance coverage). In some embodiments, given E predictive entities, during each inferential execution (i.e., during each model execution "pass") that is associated with a particular primary predictive entity, one or more feedforward neural network layers of the feedforward neural network machine learning model are configured to process the comprehensive representation of the cross-entity relationship graph data object (which may be a vector) and the node representation associated with the entity node of the particular primary predictive entity (which may also be a vector) to generate an output vector having E values, where each output value describes the cross-entity relationship score for the particular primary predictive entity with respect to one of the E predictive entities. In some embodiments, the feedforward neural network machine learning model comprises one or more feedforward neural network layers. In some embodiments, the representation aggregation machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members). In some embodiments, the feedforward neural network machine learning model is trained as part of the hybrid graph-based processing machine learning framework in an end-to-end fashion and based at least in part on historical data describing historical prediction labels (e.g., historical COB investigation labels) for particular predictive inputs (e.g., for particular individuals/employees/members).

Returning to FIG. 4, in some embodiments, determining the related entity subset of predictive entities for a primary predictive entity includes identifying a defined number of predictive entities having highest cross-entity relationship scores with respect to the primary predictive entity. In some embodiments, determining the related entity subset of predictive entities for a primary predictive entity includes identifying all predictive entities whose cross-entity relationship score with respect to the primary predictive entity satisfies (e.g., exceeds) a cross-entity relationship score for the primary predictive entity.

At step/operation 403, the predictive data analysis computing entity 106 generates a graph-based prediction for the primary predictive entity based at least in part on the related entity subset for the primary predictive entity. In some embodiments, the graph-based prediction for a primary predictive entity describes, for each related predictive entity that is in the related entity subset for the primary predictive entity, an intervention entity associated with the related predictive entity. In some embodiments, the intervention entity describes feature data associated with a real-world entity (e.g., a health insurance provider) and/or a virtual entity (e.g., a particular server system) that should be subject to one or more automated investigation operations (e.g., one or more COB investigation facilitation operations) based at least in part on the inclusion of a corresponding predictive entity in the related entity subset for a primary predictive entity. For example, the intervention entity for a particular company predictive entity may describe a health insurance company providing employment-based health insurance coverage for employees of the particular company predictive entity, where the health insurance company should be contacted via one or more COB investigation facilitation operations in order to determine COB status of an employee of a company that is associated with the primary predictive entity.

At step/operation 404, the predictive data analysis computing entity 106 performs one or more prediction-based actions based at least in part on each intervention entity identified at step/operation 403. In some embodiments, the one or more actions include generating an eligibility alert notification indicative of whether the predictive entity is eligible for a service, such as supplementary coverage. The eligibility alert notification may be provided to one or more external computing entities 102 such that the one or more end users may be aware of the predicted eligibility status of the predictive entity. As such, the one or more users may automatically be informed of predictive entities which are eligible for services.

In some embodiments, the one or more prediction-based actions may include automatically settling pending financial instrument requests associated with the predictive entity based at least in part on the predicted eligibility score for the predictive entity. For example, if the pending financial instrument is a medical claim requesting fulfillment of payment and the predictive entity is predicted to be eligible for supplementary coverage, only a portion of the requested payment may be fulfilled.

FIG. 10 depicts an operational example of an eligibility alert notification 1000. The eligibility alert notification 1000 may be indicative of the particular predictive entity (e.g., John Doe), the predicted eligibility score, information pertaining to the generation of the predicted eligibility score (e.g., time/date the predicted eligibility score was generated), and one or more recommendations.

In some embodiments, performing the actions comprises performing operational load balancing for the post-prediction systems (e.g., for COB investigation systems that use predicted COB scores as inputs to their investigative operations). For example, in some embodiments, a predictive data analysis computing entity determines D investigation classifications for D predictive entities based at least in part on the D cross-entity relationship scored for the D predictive entities (e.g., based at least in part on whether predictive entities are in the related entity subset for a particular primary predictive entity, such that a predictive entity is associated with an affirmative investigation if it is in the related entity subset). Then, the count of D predictive entities that are associated with an affirmative investigation classification, along with a resource utilization ratio for each predictive entity, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R=\text{ceil}(\Sigma_k^{k=K} ur_k)$, where R is the predicted number of computing entities needed to perform post-prediction processing operations with respect to the D predictive entities, cell(·) is a ceiling function that returns the closest integer that is greater than or equal to the value provided as the input parameter of the ceiling function, k is an index variable that iterates over K predictive entities among the D predictive entities that are associated with affirmative eligibility classifications determined based at least in part on predicted eligibility scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated COB investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

Accordingly, as described below, various embodiments of the present invention make important technical contributions to improving predictive accuracy of graph-based prediction machine learning models, which in turn improves training speed and training efficiency of training graph-based prediction machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency—Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training graph-based prediction machine learning models, thus reducing the number of computational operations needed and/or the amount of training data entries needed to train graph-based prediction machine learning models. Accordingly, the techniques described herein improve at least one of the computational efficiency, storage-wise efficiency, and speed of training graph-based prediction machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
processing feature data from a cross-entity relationship graph data object, by one or more processors and using a hybrid graph-based processing machine learning framework that comprises (a) a graph convolutional neural network, (b) an image-based convolutional neural network, and (c) a feedforward neural network, to identify a portion of the cross-entity relationship graph data object for processing by a post-prediction system by:
identifying the cross-entity relationship graph data object associated with a plurality of predictive entities relative to a primary predictive entity, wherein the cross-entity relationship graph data object comprises:
(i) a plurality of entity nodes associated with the plurality of predictive entities,
(ii) an entity node attribute, associated with an entity node of the plurality of entity nodes, that is determined based at least in part on an entity size measure associated with a predictive entity, of the plurality of predictive entities, that is associated with the entity node, and
(iii) a group of directed entity relationship edges, wherein a directed entity relationship edge of the group of directed entity relationship edges is associated with a source entity node and a destination entity node of the plurality of entity nodes,
generating, using the graph convolutional neural network and based at least in part on the cross-entity relationship graph data object, a graph convolutional representation of the cross-entity relationship graph data object,
converting, using a node visualization schema, the cross-entity relationship graph data object to a graph image data object by:
(i) converting the entity node of the cross-entity relationship graph data object to a node icon comprising a defined geographic shape centered in a defined region of the graph image data object, and
(ii) mapping a directed relationship edge of the cross-entity relationship graph data object to an edge line in the graph image data object that stretches from (a) a first node icon corresponding to the source entity node of the directed relationship edge to (b) a second node icon corresponding to the destination entity node of the directed relationship edge,
generating, using the image-based convolutional neural network and based at least in part on the graph image data object of the cross-entity relationship graph data object, an image-based convolutional representation of the cross-entity relationship graph data object,
generating a comprehensive graph representation by concatenating the graph convolutional representation and the image-based convolutional representation, and
processing, using the feedforward neural network, the comprehensive graph representation to identify the portion of the cross-entity relationship graph data object for processing by the post-prediction system based at least in part on the comprehensive graph representation; and
providing, by the one or more processors, data associated with the portion of the cross-entity relationship graph data object to the post-prediction system.

2. The computer-implemented method of claim 1, wherein the comprehensive graph representation comprises: (i) one or more extracted relational features determined based at least in part on a related edge subset for the primary predictive entity that comprises the group of directed entity relationship edges whose source predictive entity is the primary predictive entity, (ii) one or more extracted pairwise features determined based at least in part on a related pair subset of a group of entity pairs that comprise the primary predictive entity, and (iii) one or more extracted node features determined based at least in part on a related node subset of the plurality of entity nodes whose entity node attributes satisfy an entity node attribute threshold.

3. The computer-implemented method of claim 2, wherein:
(i) the one or more extracted pairwise features comprise D extracted distance features, and
(ii) an extracted distance feature of the D extracted distance features describes a cross-entity distance measure for a corresponding entity pair whose corresponding cross-entity distance measure is among D highest cross-distance entity measures associated with the related pair subset.

4. The computer-implemented method of claim 2, wherein:
(i) the one or more extracted relational features comprise C extracted contribution features, and
(ii) an extracted contribution feature of the C extracted contribution features describes a normalized historical contribution measure for a corresponding directed relationship edge whose corresponding normalized historical distribution measure is among top C highest normalized historical contribution measures associated with the related edge subset.

5. The computer-implemented method of claim 1, further comprising:
allocating one or more computing entities to the post-prediction system, responsive to a number of a plurality of currently-allocated computing entities not satisfying a number of allowed computing entities; and
deallocating the one or more computing entities from the plurality of currently-allocated computing entities, responsive to the number of the plurality of currently-allocated computing entities exceeding the number of allowed computing entities.

6. The computer-implemented method of claim 1, wherein the graph convolutional neural network and the image-based convolutional neural network are trained end to end.

7. A system comprising:
one or more processors; and
at least one memory storing processor-executable instructions that, when executed by any one or more of the one or more processors, causes the one or more processors to perform operations comprising:
processing feature data from a cross-entity relationship graph data object, using a hybrid graph-based processing machine learning framework that comprises (a) a graph convolutional neural network, (b) an image-based convolutional neural network, and (c) a feedforward neural network, to identify a portion of the cross-entity relationship graph data object for processing by a post-prediction system by:
identifying the cross-entity relationship graph data object associated with a plurality of predictive entities relative to a primary predictive entity, wherein the cross-entity relationship graph data object comprises:
(i) a plurality of entity nodes associated with the plurality of predictive entities,
(ii) an entity node attribute, associated with an entity node of the plurality of entity nodes, that is determined based at least in part on an entity size measure associated with a predictive entity, of the plurality of predictive entities, that is associated with the entity node, and
(iii) a group of directed entity relationship edges, wherein a directed entity relationship edge of the group of directed entity relationship edges is associated with a source entity node and a destination entity node of the plurality of entity nodes,
generating, using the graph convolutional neural network and based at least in part on the cross-entity relationship graph data object, a graph convolutional representation of the cross-entity relationship graph data object,
converting, using a node visualization schema, the cross-entity relationship graph data object to a graph image data object by:
(i) converting the entity node of the cross-entity relationship graph data object to a node icon comprising a defined geographic shape centered in a defined region of the graph image data object, and
(ii) mapping a directed relationship edge of the cross-entity relationship graph data object to an edge line in the graph image data object that stretches from (a) a first node icon corresponding to the source entity node of the directed relationship edge to (b) a second node icon corresponding to the destination entity node of the directed relationship edge,
generating, using the image-based convolutional neural network and based at least in part on the graph image data object of the cross-entity relationship graph data object, an image-based convolutional representation of the cross-entity relationship graph data object,
generating a comprehensive graph representation by concatenating the graph convolutional representation and the image-based convolutional representation, and
processing, using the feedforward neural network, the comprehensive graph representation to identify the portion of the cross-entity relationship graph data object for processing by the post-prediction system based at least in part on the comprehensive graph representation; and
providing data associated with the portion of the cross-entity relationship graph data object to the post-prediction system.

8. The system of claim 7, wherein the comprehensive graph representation comprises: (i) one or more extracted relational features determined based at least in part on a related edge subset for the primary predictive entity that comprises the group of directed entity relationship edges whose source predictive entity is the primary predictive entity, (ii) one or more extracted pairwise features determined based at least in part on a related pair subset of a group of entity pairs that comprise the primary predictive entity, and (iii) one or more extracted node features determined based at least in part on a related node subset of the plurality of entity nodes whose entity node attributes satisfy an entity node attribute threshold.

9. The system of claim 8, wherein:
(i) the one or more extracted pairwise features comprise D extracted distance features, and
(ii) an extracted distance feature of the D extracted distance features describes a cross-entity distance measure for a corresponding entity pair whose corresponding cross-entity distance measure is among D highest cross-distance entity measures associated with the related pair subset.

10. The system of claim 8, wherein:
(i) the one or more extracted relational features comprise C extracted contribution features, and
(ii) an extracted contribution feature of the C extracted contribution features describes a normalized historical contribution measure for a corresponding directed relationship edge whose corresponding normalized historical distribution measure is among top C highest normalized historical contribution measures associated with the related edge subset.

11. One or more non-transitory computer-readable storage media including instructions that, when executed by one or more processors, cause the one or more processors to:
process feature data from a cross-entity relationship graph data object, using a hybrid graph-based processing machine learning framework that comprises (a) a graph convolutional neural network, (b) an image-based convolutional neural network, and (c) a feedforward neural network, to identify a portion of the cross-entity relationship graph data object for processing by a post-prediction system by:
identifying the cross-entity relationship graph data object associated with a plurality of predictive entities relative to a primary predictive entity, wherein the cross-entity relationship graph data object comprises:
(i) a plurality of entity nodes associated with the plurality of predictive entities,
(ii) an entity node attribute, associated with an entity node of the plurality of entity nodes, that is determined based at least in part on an entity size measure associated with a predictive entity, of the plurality of predictive entities, that is associated with the entity node, and
(iii) a group of directed entity relationship edges, wherein a directed entity relationship edge of the group of directed entity relationship edges is associated with a source entity node and a destination entity node of the plurality of entity nodes,
generating, using the graph convolutional neural network and based at least in part on the cross-entity relationship graph data object, a graph convolutional representation of the cross-entity relationship graph data object, converting, using a node visualization schema, the cross-entity relationship graph data object to a graph image data object by:
(i) converting the entity node of the cross-entity relationship graph data object to a node icon comprising a defined geographic shape centered in a defined region of the graph image data object, and
(ii) mapping a directed relationship edge of the cross-entity relationship graph data object to an edge line in the graph image data object that stretches from (a) a first node icon corresponding to the source entity node of the directed relationship edge to (b) a second node icon corresponding to the destination entity node of the directed relationship edge, generating, using the image-based convolutional neural network and based at least in part on the graph image data object of the cross-entity relationship graph data object, an image-based convolutional representation of the cross-entity relationship graph data object, generating a comprehensive graph representation by concatenating the graph convolutional representation and the image-based convolutional representation, and processing, using the feedforward neural network, the comprehensive graph representation to identify the portion of the cross-entity relationship graph data object for processing by the post-prediction system based at least in part on the comprehensive graph representation; and provide data associated with the portion of the cross-entity relationship graph data object to the post-prediction system.

12. The one or more non-transitory computer-readable storage media of claim 11, wherein the comprehensive graph representation comprises: (i) one or more extracted relational features determined based at least in part on a related edge subset for the primary predictive entity that comprises the group of directed entity relationship edges whose source predictive entity is the primary predictive entity, (ii) one or more extracted pairwise features determined based at least in part on a related pair subset of a group of entity pairs that comprise the primary predictive entity, and (iii) one or more extracted node features determined based at least in part on a related node subset of the plurality of entity nodes whose entity node attributes satisfy an entity node attribute threshold.

13. The one or more non-transitory computer-readable storage media of claim 12, wherein:
(i) the one or more extracted pairwise features comprise D extracted distance features, and
(ii) an extracted distance feature of the D extracted distance features describes a cross-entity distance measure for a corresponding entity pair whose corresponding cross-entity distance measure is among D highest cross-distance entity measures associated with the related pair subset.

14. The one or more non-transitory computer-readable storage media of claim 12, wherein:
(i) the one or more extracted relational features comprise C extracted contribution features, and
(ii) an extracted contribution feature of the C extracted contribution features describes a normalized historical contribution measure for a corresponding directed relationship edge whose corresponding normalized historical distribution measure is among top C highest normalized historical contribution measures associated with the related edge subset.

* * * * *